United States Patent
Kaneko et al.

(10) Patent No.: US 7,455,133 B2
(45) Date of Patent: Nov. 25, 2008

(54) ELECTRIC FOUR-WHEEL DRIVE VEHICLE AND CONTROL UNIT FOR SAME

(75) Inventors: Satoru Kaneko, Naka (JP); Tatsuyuki Yamamoto, Mito (JP); Masaru Ito, Hitachinaka (JP); Hisaya Shimizu, Hitachinaka (JP); Kenta Katsuhama, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 137 days.

(21) Appl. No.: 11/352,259

(22) Filed: Feb. 13, 2006

(65) Prior Publication Data

US 2006/0201730 A1    Sep. 14, 2006

(30) Foreign Application Priority Data

Mar. 14, 2005    (JP) ............... 2005-070919

(51) Int. Cl.
   *B60K 1/00* (2006.01)
(52) U.S. Cl. ............... 180/65.2; 180/65.1; 180/65.3; 180/65.4
(58) Field of Classification Search ............... 180/65.2, 180/65.1, 65.3, 65.4
   See application file for complete search history.

(56) References Cited

U.S. PATENT DOCUMENTS 5,726,558 A * 3/1998 Umeda et al. ............... 322/27
6,484,832 B1 * 11/2002 Morisawa et al. ........... 180/65.2
7,032,699 B2 * 4/2006 Sakata et al. ................. 180/247
7,135,784 B2 * 11/2006 Murty et al. ................. 290/36 R
2004/0040759 A1 * 3/2004 Shimizu et al. ............. 180/65.2
2004/0163860 A1 * 8/2004 Matsuzaki et al. .......... 180/65.2

FOREIGN PATENT DOCUMENTS

| JP | 4-322191 A |   | 11/1992 |
|----|------------|---|---------|
| JP | 2000-188804 |   | 7/2000 |
| JP | 2001-239852 |   | 9/2001 |
| JP | 2002-186109 A |   | 6/2002 |
| JP | 2002/186109 A | * | 6/2002 |
| JP | 2004-222422 A |   | 8/2004 |
| JP | 2004-320995 A |   | 11/2004 |

OTHER PUBLICATIONS

Japanese Office Action dated Mar. 18, 2008 (three (3) pages).

* cited by examiner

*Primary Examiner*—Christopher P Ellis
*Assistant Examiner*—Katy Meyer
(74) *Attorney, Agent, or Firm*—Crowell & Moring LLP

(57) ABSTRACT

An electric four-wheel drive vehicle and a control unit for the same, which can be applied to cars of class having larger displacements than the class to which the electric four-wheel drive vehicle equipped with the DC motor is applied, without increasing the cost over that of the known mechanical four-wheel drive vehicle. Front wheels of the vehicle are driven by an engine, and rear wheels are driven by an AC motor. A generator is driven by a rotating force of the engine to output DC power. An inverter converts the DC power outputted from the generator to AC power. A control unit controls the generator such that energy Pm required for driving the AC motor is outputted from the generator.

5 Claims, 21 Drawing Sheets

ELECTRIC FOUR-WHEEL DRIVE VEHICLE AND CONTROL UNIT FOR SAME

BACKGROUND OF THE INVENTION

1. Field of the Invention

The present invention relates to an electric four-wheel drive vehicle in which front wheels are rotated by a driving force from an engine and rear wheels are rotated by a driving force from a motor, and also relates to an engine control unit for the electric four-wheel drive vehicle.

2. Description of the Related Art

Recently, vehicles running with motors used as driving sources have become increasingly popular. They are called eco-friendly cars and represented by electric vehicles and hybrid vehicles. As major features, each of those vehicles mounts a battery and has the function of utilizing electric power of the battery to generate torque from a motor for driving of the vehicle. In an electric vehicle, the battery is charged using an onboard or external charger. In a hybrid vehicle, the battery is charged by driving a generator with an engine (or causing a motor to generate electric power).

Along with the eco-friendly cars, an electric four-wheel drive (4WD) vehicle of the type directly driving front wheels by an engine and driving rear wheels by a motor has also recently become popular. In one known example of such an electric four-wheel drive vehicle, as disclosed in JP-A-2001-239852 (Patent Document 1), a dedicated generator is connected to an engine to generate electric power from the generator by utilizing a rotating force of the engine, and a DC (Direct Current) motor mounted for driving rear wheels is rotated by DC power outputted from the generator, thereby producing torque. That type of electric four-wheel drive vehicle provides a system that is superior in mountability to the known mechanical 4WD vehicle and is able to realize a lower cost because of advantages such as being batteryless. Also, the electric four-wheel drive vehicle equipped with the DC motor provides a very safe system in which electric power (DC power) generated by the generator is supplied to the DC motor directly (without power conversion). The electric four-wheel drive vehicle equipped with the DC motor is mainly applied to small-sized cars of 1-liter class from the viewpoint of mountability. The DC motor having a small output of about 2-4 kW is used in the small-sized car of 1-liter class because it has a small vehicle weight and operates the motor only in the take-off stage from start to a low speed.

As a known system analogous to the electric 4WD system, JP-A-2000-188804 (Patent Document 2), for example, discloses a hybrid vehicle in which a generator is mechanically connected to an engine, a large-capacity battery is connected to the generator, and a permanent-magnet synchronous motor for converting electric energy to motive power is connected to an output portion of the battery. In that hybrid vehicle, the generator generates electric power with a rotating force from the engine, and the synchronous motor is rotated by the generated electric power to produce the motive power. Further, because the battery is connected to an output portion of the generator, the electric power can be recovered to the battery during regenerative operation to apply an electric brake. That type of hybrid vehicle is mainly applied to large-sized cars of 2-liter class. The permanent-magnet synchronous motor having a large output of about 20 kW is used in the large-sized car of 2-liter class because it has a large vehicle weight and operates the motor over a wide speed range from start to a medium speed.

SUMMARY OF THE INVENTION

The known electric four-wheel drive vehicle equipped with the DC motor has a limit in further increasing the output of the DC motor from the viewpoint of mountability and therefore has a difficulty in application to larger-sized cars beyond the 1-liter class.

Comparing with the conventional mechanical 4WD vehicle in which four wheels are driven by an engine, the electric four-wheel drive vehicle is advantageous in having better mountability, a faster torque response, and a lower cost. To realize in particular the lower cost that is very significant from the practical point of view, it is important that the electric four-wheel drive vehicle be constructed as a system mounting no large-capacity battery. With the large-capacity battery not mounted, the electric four-wheel drive vehicle is not allowed to make regenerative operation from the motor and excessive generation of electric power from the generator beyond a necessary level, which are allowed in the hybrid vehicle mounting the battery. Consequently, the electric four-wheel drive vehicle is required to perform generator control capable of generating electric power by the generator with high accuracy.

An object of the present invention is to provide an electric four-wheel drive vehicle and a control unit for the same, which can be applied to cars of class having larger displacements than the class to which the electric four-wheel drive vehicle equipped with the DC motor is applied, without increasing the cost over that of the known mechanical four-wheel drive vehicle.

Thus, according to one aspect, the present invention provides an electric four-wheel drive vehicle which can be applied to cars of class having larger displacements than the class to which the electric four-wheel drive vehicle equipped with the DC motor is applied, without increasing the cost over that of the known mechanical four-wheel drive vehicle.

The electric four-wheel drive vehicle in which one of wheels are driven by an internal combustion engine according to the one aspect of the present invention is featured in comprising a motor for driving rear wheels, the motor being an AC motor; a generator driven by a rotating force of the internal combustion engine and outputting DC power; an inverter for converting the DC power outputted from the generator to AC power; and a control unit for controlling the generator such that energy Pm required for driving the AC motor is outputted from the generator.

According to another aspect, the present invention provides a control unit for an electric four-wheel drive vehicle, which can be applied to cars of class having larger displacements than the class to which the electric four-wheel drive vehicle equipped with the DC motor is applied, without increasing the cost over that of the known mechanical four-wheel drive vehicle.

The control unit for the electric four-wheel drive vehicle according to the other aspect of the present invention is featured in controlling the generator such that energy Pm required for driving the AC motor is outputted from the generator.

According to the present invention, the electric four-wheel drive vehicle can be applied to cars of larger displacement class at a relatively low cost.

DESCRIPTION OF THE PREFERRED EMBODIMENTS

The construction of an electric four-wheel drive vehicle according to a first embodiment of the present invention will be described below with reference to FIGS. 1-11.

The overall construction of the electric four-wheel drive vehicle of this embodiment will be first described with reference to FIG. 1.

Figure 1:
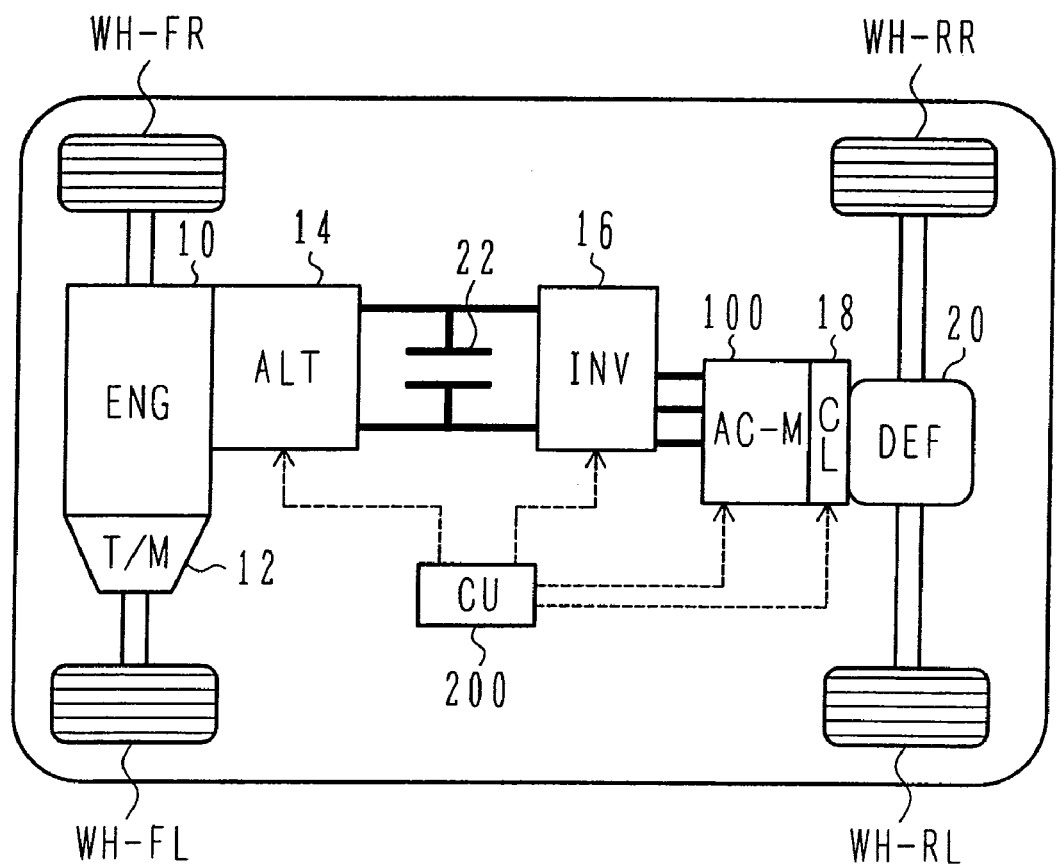
FIG. 1 is a schematic view showing the system configuration of an electric four-wheel drive vehicle according to a first embodiment of the present invention.

FIG. 1 is a schematic view showing the system configuration of the electric four-wheel drive vehicle according to a first embodiment of the present invention.

In the electric four-wheel drive vehicle of this embodiment, a driving force outputted from an engine (ENG) 10 is transmitted to front wheels WH-FR and WH-FL through a transmission (T/M) 12, whereby the front wheels WH-FR and WH-FL are driven. Also, the engine 10 drives a generator (ALT) 14. The generator 14 is, e.g., of the type capable of variably outputting electric power up to a voltage higher than that of a generator adapted for a 14-V power supply which is used to supply electric power to onboard auxiliaries, such as a battery having a rated voltage of 12 V. DC power generated by the generator 14 is supplied through a smoothing capacitor 22 to an inverter (INV) 16 for conversion to AC power. The AC power is supplied to armature coils of an AC motor (synchronous motor) 100, thereby driving the synchronous motor 100. A driving force (torque) outputted from the AC motor 100 is transmitted to rear wheels WH-RR and WH-RL through a clutch 18 and a differential gear 20, whereby the rear wheels WH-RR and WH-RL are driven. A control unit (CU) 200 controls a field current of the generator 14 for control of a voltage of the generated electric power. Also, the control unit 200 controls the inverter 16 for control of a voltage supplied to the motor 100 and control of the driving force outputted from the motor 100. Further, the control unit 200 controls field currents flowing through field coils of the AC motor 100 for control of the driving force outputted from the motor 100. In addition, the control unit 200 controls engagement and disengagement the clutch 18. More specifically, the clutch 18 is engaged in a range from start to a predetermined vehicle speed (medium speed) (maximum rotation speed of the AC motor 100). In a range higher than that range, the clutch 18 is disengaged to drive only the front wheels by the engine 10. A power device for switching operation under control of the control unit 200 is included in the inverter 16. As a result of the switching operation of the power device, the power obtained in an input section of the inverter 16 includes pulsations. The smoothing capacitor 22 serves to smooth those pulsations.

The known electric four-wheel drive vehicle employs a DC motor as the motor for driving the rear wheels. Because the DC motor is mounted under a vehicle body near the differential gear 20, there is a limit in size of the motor capable of being mounted. On the other hand, because a small-sized DC motor cannot so increase a producible output, it has a difficulty in application to larger-sized vehicles beyond the 1-liter class.

In contrast, according to this embodiment, since the AC motor is used as the motor for driving the rear wheels, a larger output can be produced from the AC motor in comparison with the DC motor, and this embodiment can be applied to cars having larger displacements.

A permanent-magnet synchronous motor or a field-coil synchronous motor can be used as the AC motor. Particularly, using the field-coil synchronous motor is more effective for the reason described below.

In the electric four-wheel drive vehicle, the performance required for the motor for driving the rear wheels is first represented by a wide range of operating point. For example, when the vehicle is started in deep snow, it is important that the vehicle be able to start with only the rear wheels, and the vehicle is required to output large torque in a low speed range. Also, when four-wheel driving is continued until running in a medium speed range, the motor is required to rotate at a very high speed. Due to the presence of magnetic flux of a permanent magnet, the permanent-magnet synchronous motor cannot be driven up to a required high-speed rotation range in some cases. Accordingly, the field-coil synchronous motor is more effective than the permanent-magnet synchronous motor as the AC motor used in the electric four-wheel drive vehicle.

The field-coil synchronous motor can suppress the field current in the high-speed rotation range and hence can hold the produced magnetic flux small. It is therefore possible to hold the induced voltage small and to drive the motor up to the high-speed rotation range.

Output characteristics of the field-coil synchronous motor and the permanent-magnet synchronous motor will be described below with reference to FIG. 2.

Figure 2:
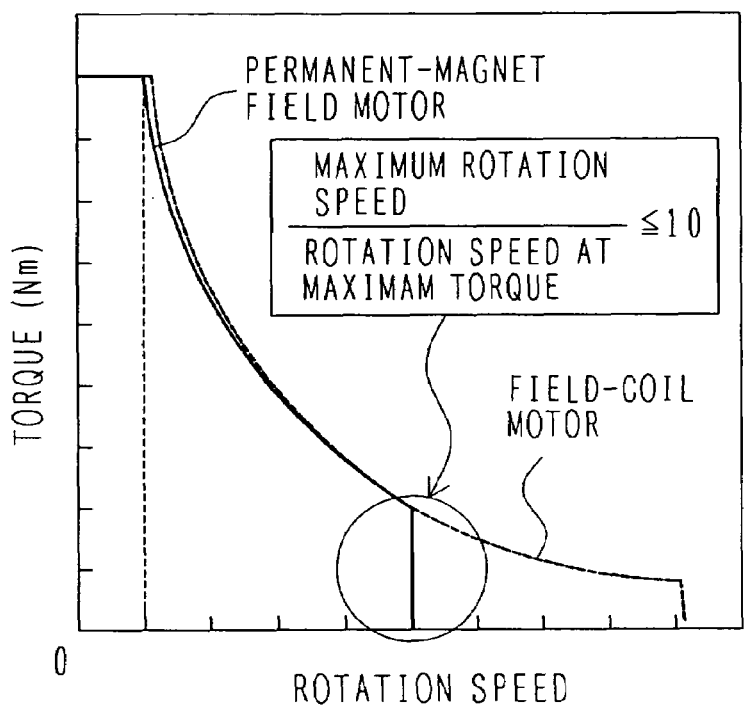
FIG. 2 is a graph showing output characteristics of a field-coil synchronous motor and a permanent-magnet synchronous motor.

FIG. 2 is a graph showing output characteristics of the field-coil synchronous motor and the permanent-magnet synchronous motor. In FIG. 2, the horizontal axis represents a rotation speed (rpm), and the vertical axis represents torque (Nm).

As shown in FIG. 2, a maximum rotation speed of the permanent-magnet synchronous motor is decided so as to fall within a range satisfying (maximum rotation speed/rotation speed at maximum torque)$\leq$10. Therefore, the maximum rotation speed of the permanent-magnet synchronous motor is lower than that of the field-coil synchronous motor. On the other hand, the field-coil synchronous motor can be rotated up to its maximum rotation speed higher than that of the permanent-magnet synchronous motor, and when exceeding the maximum rotation speed, the field-coil synchronous motor is disconnected from the rear wheels upon disengagement of the clutch disposed between the synchronous motor and the rear wheels.

In the field-coil AC synchronous motor, as mentioned above, the magnetic flux can be changed depending on the field current. In the electric four-wheel drive system, therefore, the field current is changed with respect to the motor rotation speed to positively change the magnetic flux produced. Thus, by employing the field-coil synchronous motor and controlling the field current depending on the operating point of the motor, the motor can be driven at the required operating point within the range of allowable motor current without exceeding the maximum voltage of the system.

Also, the electric four-wheel drive vehicle of this embodiment, shown in FIG. 1, is featured in that a battery dedicated for the motor 100 is not mounted. In a hybrid vehicle or the like, a battery serving as an electric power generating source and an electric power recovering source is connected between a generator and a motor, and the battery has a large capacity. In the electric four-wheel drive vehicle, however, such a large-capacity battery cannot be mounted because of the necessity of holding the cost lower than that of the known mechanical four-wheel drive vehicle.

The control principle of the electric four-wheel drive vehicle mounting no large-capacity battery will be described below with reference to FIG. 3.

Figure 3:
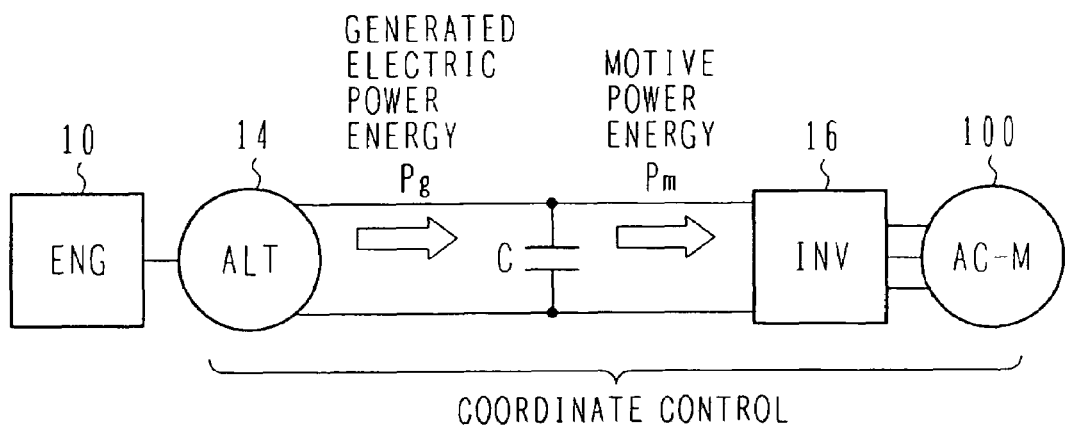
FIG. 3 is an energy flowchart of the electric four-wheel drive vehicle employing an AC motor without mounting a large-capacity battery.

FIG. 3 is an energy flowchart of the electric four-wheel drive vehicle employing the AC motor of this embodiment without mounting the large-capacity battery.

In the electric four-wheel drive system using the AC motor, because the system includes no battery absorbing electric power, coordinate control has to be performed so that energy Pg of generated electric power, which is outputted from the generator by being given with the rotating force from the engine, is kept equal to driving energy (motive power energy) Pm inputted to the inverter and the motor. When the balance between the generated electric power energy Pg and the driving energy Pm is lost, for example, when the generated electric power energy Pg is larger than the driving energy Pm, excessive electric power flows into the smoothing capacitor and the voltage of a DC bus is boosted. If the voltage of the DC bus exceeds an allowable value, there may occur a risk that the capacitor and the power device in the inverter are damaged. Also, when the generated electric power energy Pg is smaller than the driving energy Pm, the electric power stored in the capacitor is consumed, though being small, by the inverter and the motor, thus resulting in that the voltage is reduced and desired torque cannot be outputted.

To overcome those problems, in the present invention, the generator is controlled such that the energy Pm required for driving the AC motor is outputted from the generator.

Further, in the inverter and the motor, torque control can be performed with a high response and high accuracy by executing current control on the d-q coordinates. On the other hand, generator control for the generator can be performed only by control of the field current, which is relatively slow in response. The generator control for the generator has to be performed with high accuracy in match with behaviors of the inverter and the motor.

To that end, in the present invention, an output voltage of the generator is feedback controlled so that a voltage Vdc on the input side of the inverter is matched with a voltage command value Vdc* for generating the energy Pm consumed by driving of the AC motor. Also, an output current of the generator is feedback controlled so that a current Idc on the input side of the inverter is matched with a current command value Idc* for generating the energy Pm consumed by driving of the AC motor.

Note that, in the present invention, the arrangement not mounting the large-capacity battery does not exclude a possibility of mounting a small-capacity battery. Here, the term "small-capacity battery" means a battery having such an extent of capacity that it cannot produce the maximum output of the motor for a specified time by alone, but it can satisfy the maximum output of the motor when combined with the generator output. Additionally, the present invention is also applicable to a simplified HEV (Hybrid Electric Vehicle) system including a battery.

The configuration of the control unit for the electric four-wheel drive vehicle of this embodiment will be described below with reference to FIGS. 4-9.

The system configuration of the control unit for the electric four-wheel drive vehicle of this embodiment will be first described with reference to FIG. 4.

Figure 4:
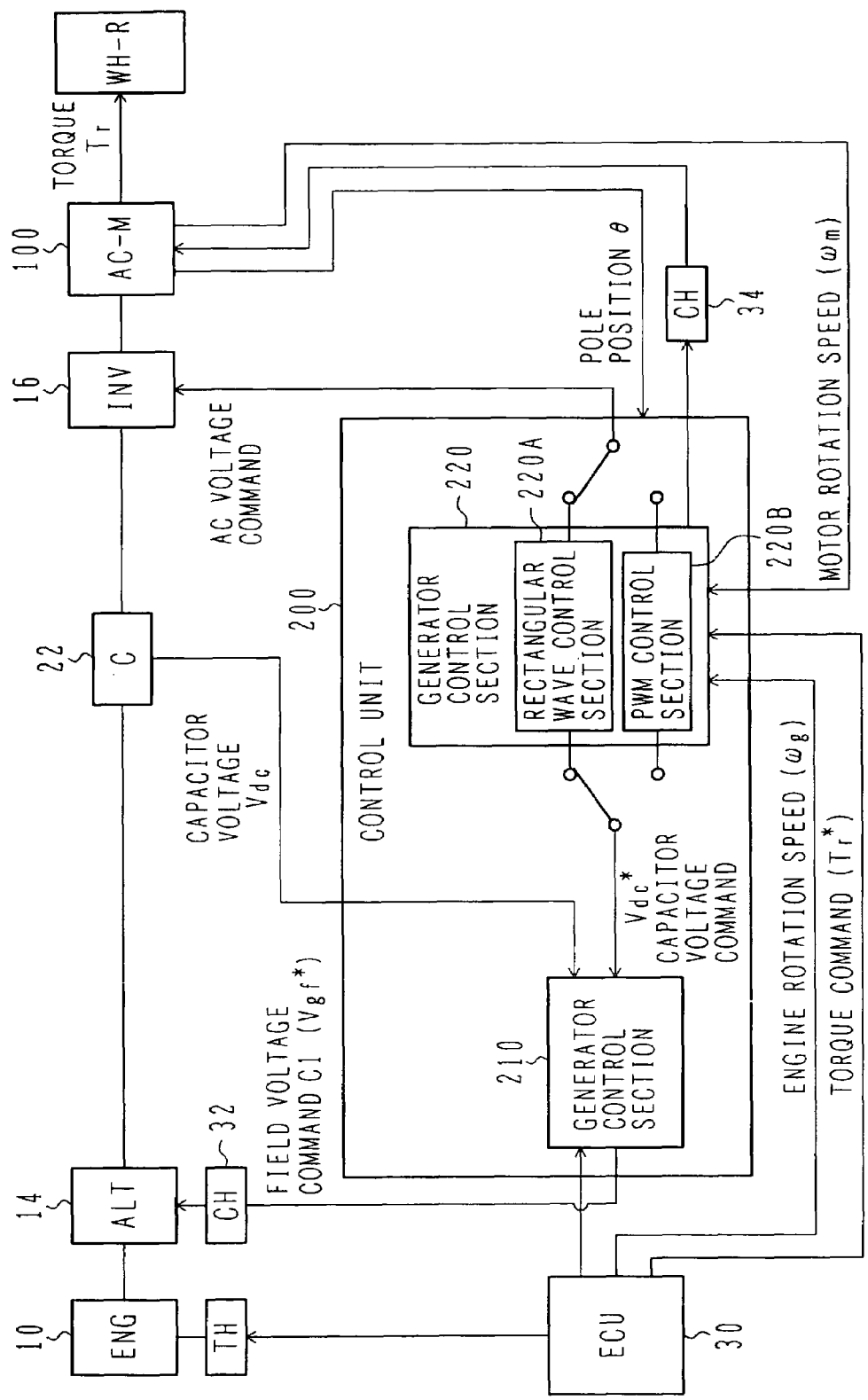
FIG. 4 is a block diagram showing a first system configuration of a control unit for the electric four-wheel drive vehicle according to the first embodiment of the present invention.

FIG. 4 is a block diagram showing a first system configuration of the control unit for the electric four-wheel drive vehicle according to the first embodiment of the present invention. The same reference numerals as those in FIG. 1 denote the same components.

The control unit 200 includes a generator control section 210 and a motor control section 220. The configuration and operation of the generator control section 210 will be described in detail later with reference to FIGS. 5 and 6. To describe briefly, the generator control section 210 feedback-controls a field voltage command C1(Vgf*) for the field coils of the generator 14 so that a voltage Vdc between both terminals of the capacitor 22 is matched with a capacitor voltage command value Vdc* outputted from the motor control section 220. The field voltage command C1(Vgf*) is inputted to a chopper (CH) circuit 32 for controlling the field current of the generator 14.

The motor control section 220 includes a rectangular wave control section 220A and a PWM control section 220B. The configuration and operation of the motor control section 220 will be described in detail later with reference to FIG. 5. To describe briefly, based on a motor torque command Tr* outputted from an engine control unit (ECU) 30, a motor rotation speed ωm detected by a rotation speed sensor associated with the synchronous motor 100, and a pole position θ detected by a pole position sensor associated with the synchronous motor 100, the motor control section 220 outputs 3-phase AC voltage commands Vu*, Vv* and Vw* which are supplied to the inverter 16 for control of the inverter 16, whereby the AC power supplied to the armature coils of the synchronous motor 100 is controlled and the driving force outputted from the synchronous motor 100 is controlled. The driving force outputted from the synchronous motor 100 is controlled such that driving torque of the synchronous motor is reduced as the rotation speed of the synchronous motor 100 increases. Also, the motor control section 220 outputs a field current command Imf* to a chopper (CH) circuit 34 for controlling the field current of the synchronous motor 100, to thereby control the chopper circuit 34 and further control a field current If of the synchronous motor 100.

Figure 5:
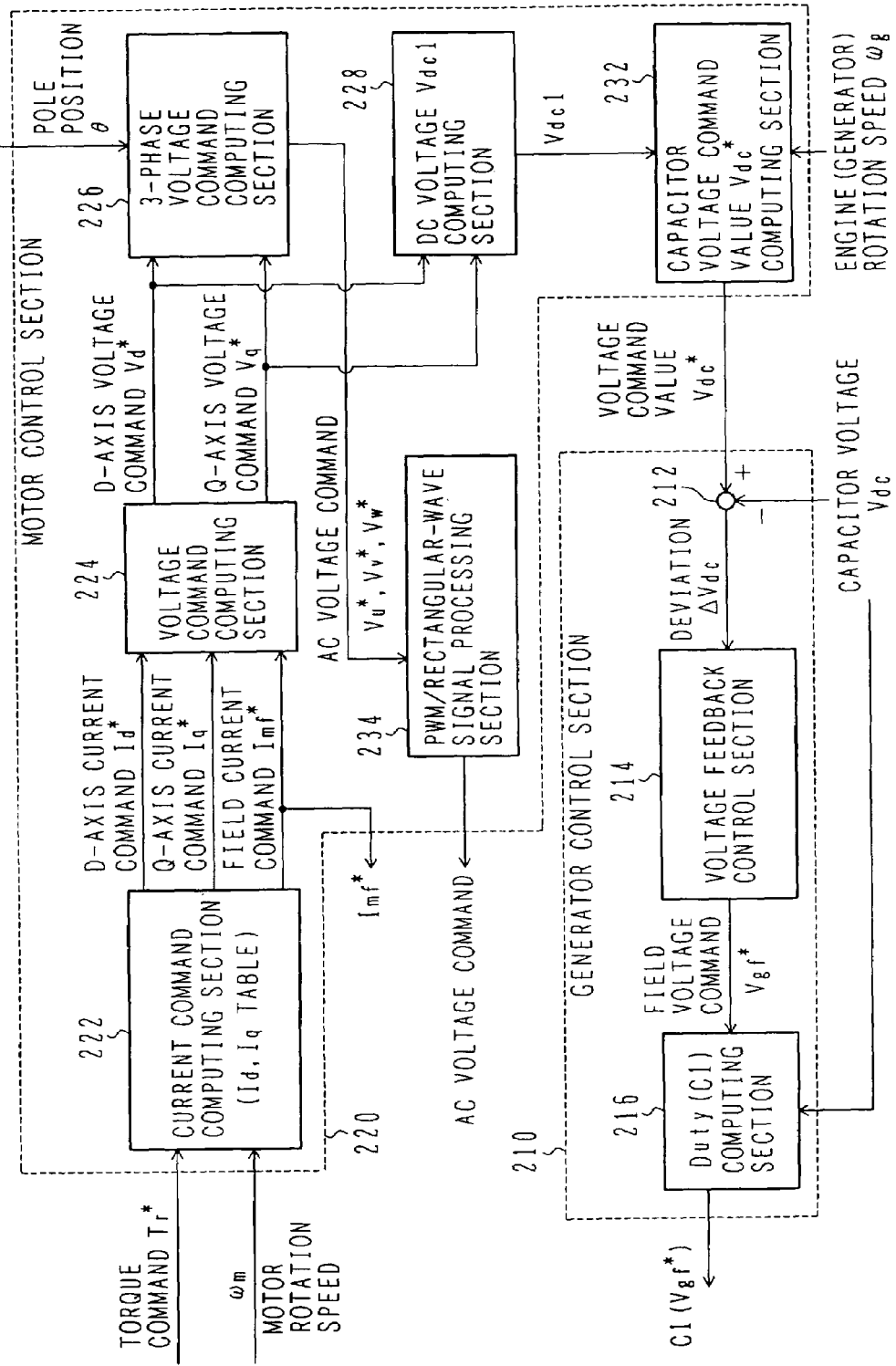
FIG. 5 is a block diagram showing the configuration of the control unit for the electric four-wheel drive vehicle according to the first embodiment of the present invention.

The field current command Imf* is decided based on the torque command Tr* and the motor rotation speed ωm in a current command computing section 222 shown in FIG. 5. As one example, by using a three-dimensional table (map) containing the torque command Tr*, the motor rotation speed ωm and the field current command Imf*, the field current command Imf* can be decided from the torque command Tr* and the motor rotation speed ωm. Basically, the field current command imf* is controlled so as to decrease with an increase of the motor rotation speed, because the induced voltage is increased as the motor rotation speed increases. The field current If can also be changed depending on the torque command Tr*. By changing the field current If depending on the magnitude of the torque command Tr*, motor efficiency can be increased in comparison with the case of keeping the field current constant. A detected value of the motor field current is feedback controlled with respect to the field current command Imf*, which has been decided in the current command computing section 222, so that the field current If is generated as per the field current command Imf*.

In the above-mentioned process, the output value obtained with the feedback control of the field current If corresponds to a field voltage command Vgf*, and this field voltage command Vgf* is inputted to the chopper circuit 34, thus causing the field current If to flow. While the chopper circuit 34 is assumed here as being an H-bridge circuit, the object of the present invention can also be realized even with a circuit including one switching device connected in series to the field coils because the field current If flows in a constant direction.

As described above, by changing the field current command Imf* depending on the motor operating point and controlling the actual field current to precisely follow the value of the field current command Imf*, torque control can be realized with high efficiency and high accuracy within a limited voltage range.

The motor control section 220 selectively changes over the rectangular wave control section 220A and the PWM control section 220B depending on the motor rotation speed. For example, PWM control is performed in the stopped state and the low speed range, while rectangular wave control is performed in the medium- and high-speed ranges (e.g., 5000 rpm or higher).

The configuration of the generator control section 210 of the control unit for the electric four-wheel drive vehicle of this embodiment will be described below with reference to FIGS. 5 and 6.

FIG. 5 is a block diagram showing the configuration of the control unit for the electric four-wheel drive vehicle according to the first embodiment of the present invention. The same reference numerals as those in FIG. 4 denote the same components. FIG. 6 is a flowchart showing the operation of the generator control section of the control unit for the electric four-wheel drive vehicle according to the first embodiment of the present invention.

As shown in FIG. 5, the generator control section 210 includes a subtracter 212, a voltage feedback control section 214, and a Duty(C1) computing section 216.

Figure 6:
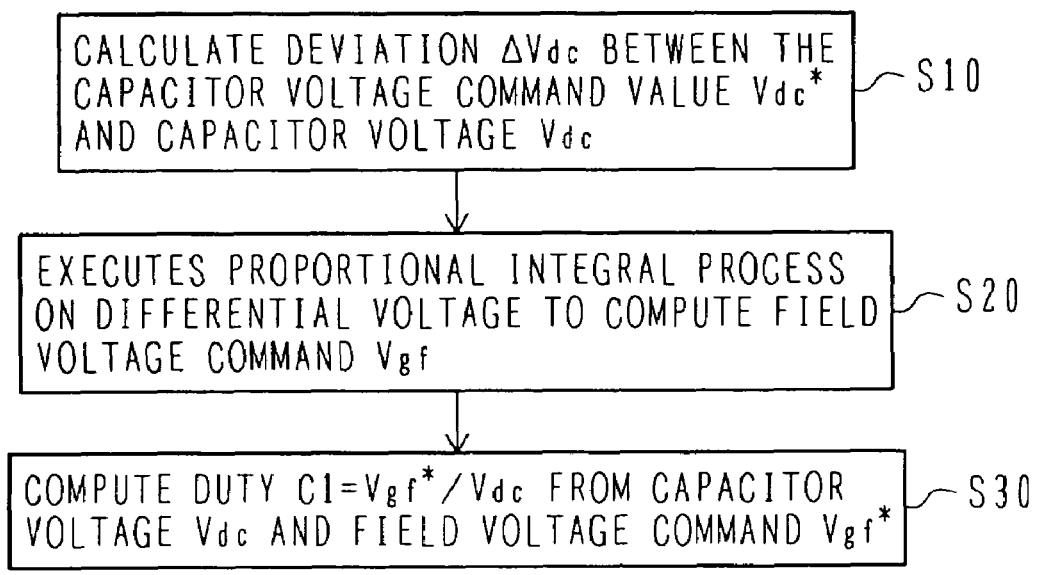
FIG. 6 is a flowchart showing the operation of a generator control section of the control unit for the electric four-wheel drive vehicle according to the first embodiment of the present invention.

In step S10 of FIG. 6, the subtracter 212 calculates a deviation ΔVdc between the capacitor voltage command value Vdc* outputted from the motor control section 220 and the capacitor voltage Vdc between both the terminals of the capacitor 22.

Then, in step S20 of FIG. 6, the voltage feedback control section 214 executes a proportional integral (PI) process on the deviation ΔVdc calculated by the subtracter 212, to thereby output a field voltage command Vgf. While this embodiment is described as executing the PI control, the control process is not limited to the PI control. Also, if the use of only a feedback control system cannot provide a response at a sufficient level, the control process may include a feed-forward compensation system.

Then, in step S30 of FIG. 6, the Duty(C1) computing section 216 computes a duty C1(Vgf*), as Vgf*/Vdc, from the capacitor voltage Vdc and the field voltage command Vgf* outputted from the voltage feedback control section 214. The computed DutyC1(Vgf*) signal is supplied to the field coils of the generator 14 for feedback control so that the capacitor voltage Vdc between both the terminals of the capacitor 22 is matched with the capacitor voltage command value Vdc*.

The configuration of the motor control section 220 of the control unit for the electric four-wheel drive vehicle of this embodiment will be described below with reference to FIGS. 5, 7 and 8.

As shown FIG. 5, the motor control section 220 includes a current command computing section 222, a voltage command computing section 224, a 3-phase voltage command computing section 226, a DC voltage Vdc1 computing section 228, a capacitor voltage command-value Vdc* computing section 232, and a PWM/rectangular-wave signal processing section 234.

The current command computing section 222 computes, based on the motor torque command Tr* outputted from the ECU 30 shown in FIG. 4 and the motor rotation speed ωm detected by the rotation speed sensor associated with the synchronous motor 100 shown in FIG. 4, a d-axis current command Id*, a q-axis current command Iq* and a field current command Imf* for the synchronous motor 100 by using internal ID and Iq tables. The field current command Imf* is supplied to the chopper (CH) circuit 34 for controlling the field current of the synchronous motor 100, to thereby control the chopper circuit 34 and further control the field current If of the synchronous motor 100.

The voltage command computing section 224 computes a d-axis voltage command Vd* and a q-axis voltage command Vq* from the d-axis current command Id* and the q-axis current command Iq*, respectively, which have been computed by the current command computing section 222.

The 3-phase voltage command computing section 226 computes AC voltage commands Vu*, Vv* and Vw* for the synchronous motor 100 based on the d-axis voltage command Vd* and the q-axis voltage command Vq*, which have been computed by the voltage command computing section 224, by using the pole position θ detected by the pole position sensor associated with the synchronous motor 100.

The PWM/rectangular-wave signal processing section 234 produces, based on the AC voltage commands Vu*, Vv* and Vw* which have been computed by the 3-phase voltage command computing section 226, a drive signal for a switching device in the inverter 16 and outputs the produced drive signal to the inverter 16 for the PWM control or the rectangular wave control of the inverter 16.

The operation of the DC voltage Vdcl computing section 228 will be described below with reference to FIG. 7.

Figure 7:
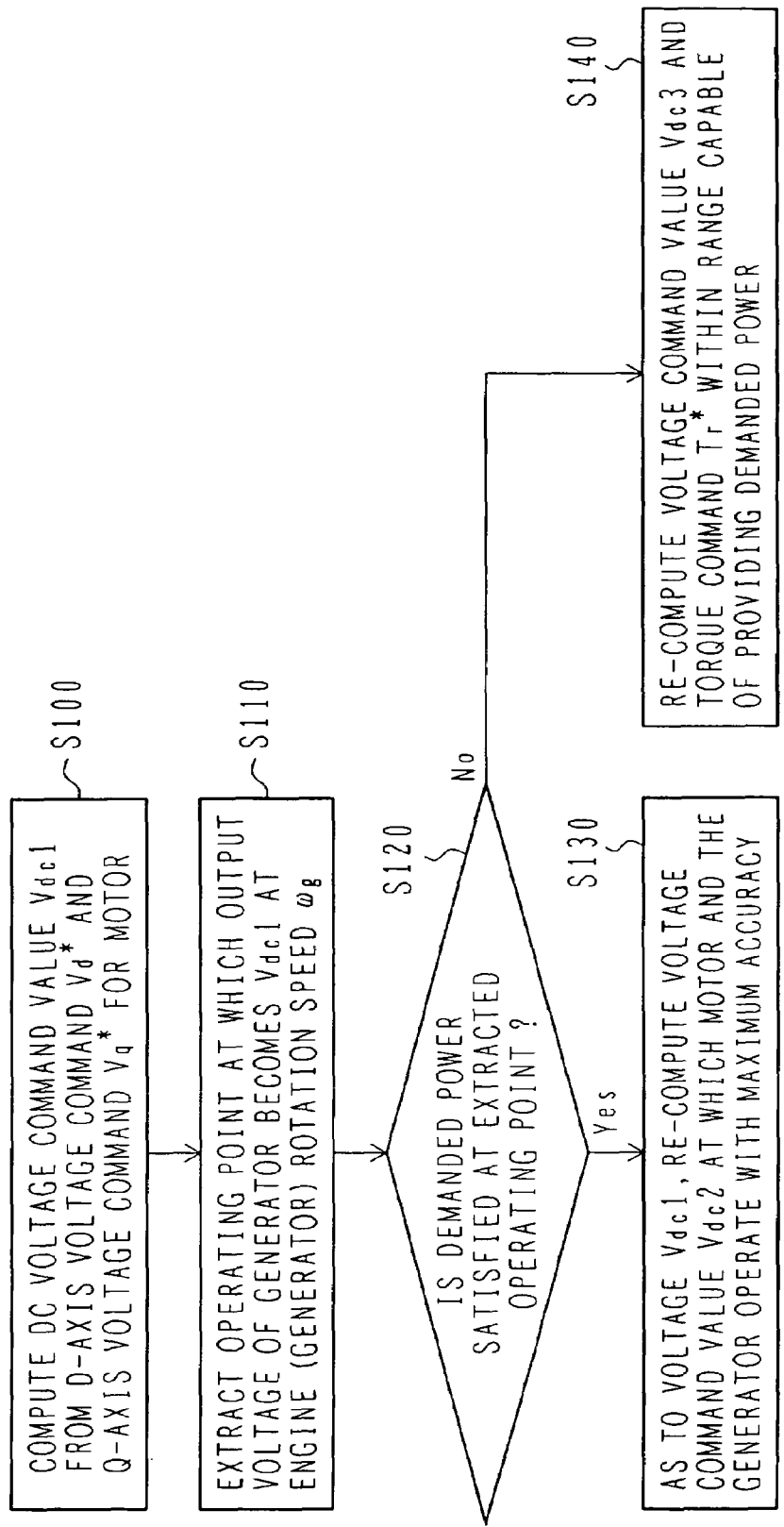
FIG. 7 is a flowchart showing the operation of a motor control section of the control unit for the electric four-wheel drive vehicle according to the first embodiment of the present invention.

FIG. 7 is a flowchart showing the operation of the motor control section of the control unit for the electric four-wheel drive vehicle according to the first embodiment of the present invention.

The DC voltage Vdc1 computing section 228 computes a command value Vdc1 for an output voltage of the generator 14, i.e., for the capacitor voltage Vdc between both the terminals of the capacitor 22, based on the d-axis voltage command Vd* and the q-axis voltage command Vq* which have been computed by the voltage command computing section 224.

In step S100 of FIG. 7, the DC voltage Vdc1 computing section 228 computes a DC voltage command value Vdc1 based on the d-axis voltage command Vd* and the q-axis voltage command Vq*. More specifically, the DC voltage Vdc1 computing section 228 computes a phase voltage V of the motor from the d-axis voltage command Vd* and the q-axis voltage command Vq* by using the following formula (1):

$$V=(\sqrt{(Vd^{*2}+Vq^{*2})})/\sqrt{3} \quad (1)$$

Further, the DC voltage Vdc1 computing section 228 computes the DC voltage command value Vdc1 from the phase voltage V of the motor by using the following formula (2) in the case of the PWM control and using the following formula (3) in the case of the rectangular wave control:

$$Vdc1=(2\sqrt{2})\cdot V \quad (2)$$

$$Vdc1=((2\sqrt{2})\cdot V)/1.27 \quad (3)$$

Then, in step S110, the capacitor voltage command-value Vdc* computing section 232 extracts an operating point at which the output voltage of the generator becomes Vdc1 at an engine rotation speed ωg, by using the characteristics of the generator. A speed reducing mechanism is disposed between the generator 14 and the engine 10. Assuming a speed reduction ratio to be 2.5, for example, the engine rotation speed ωg=600 rpm corresponds to a generator rotation speed ωg'=1500 rpm.

The electric power generation characteristics of the generator will be described with reference to FIG. 8.

Figure 8:
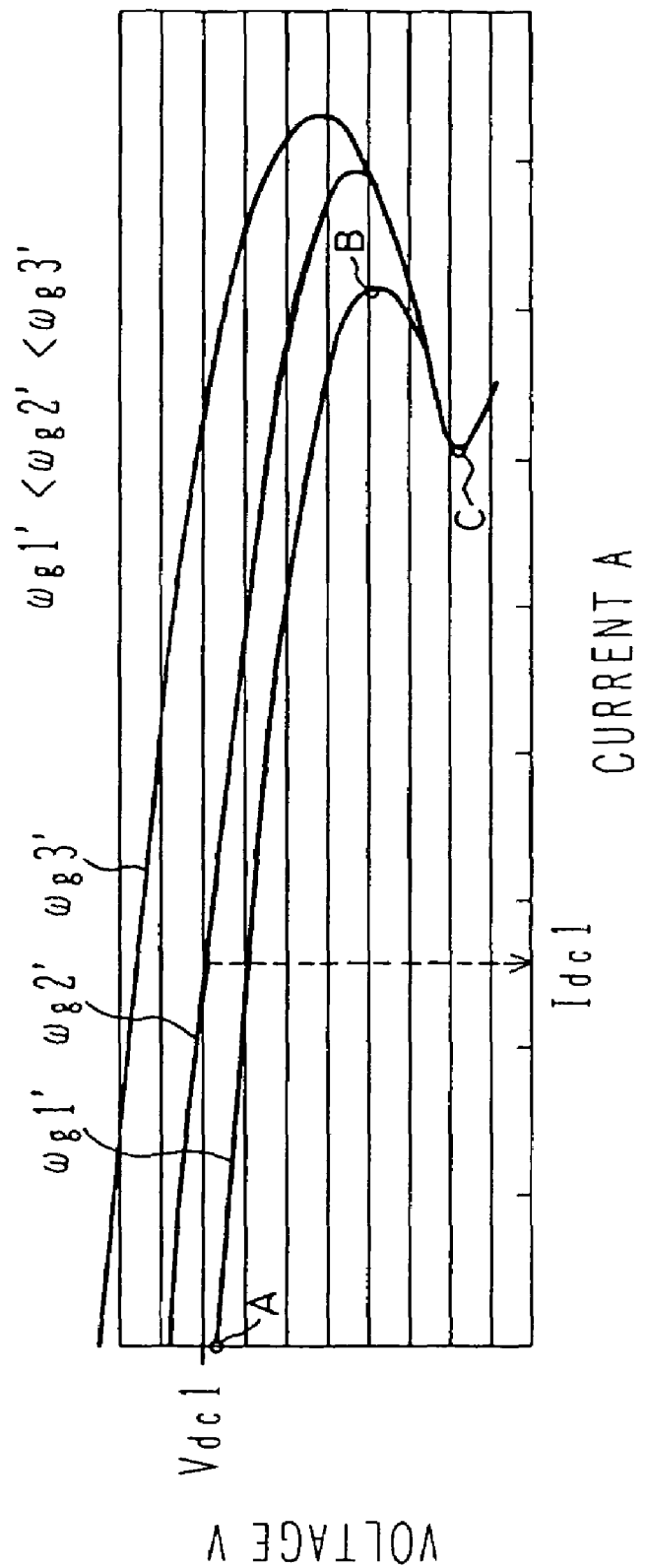
FIG. 8 is a characteristic graph showing electric power generation characteristics of the generator.

FIG. 8 is a characteristic graph showing the electric power generation characteristics of the generator.

In FIG. 8, the horizontal axis represents the output current of the generator and the vertical axis represents the output voltage of the generator. The output voltage and current of the generator are changed as indicated by plotted curves. Also, when the generator rotation speed ωg' is changed (ωg1'<ωg2'<ωg3'), the output voltage and current of the generator are also changed as indicated by the plotted curves.

By using the characteristics of the generator shown in FIG. 7, the capacitor voltage command-value Vdc* computing section 232 extracts an operating point, i.e., a point of a current Idc1, at which the output voltage of the generator becomes Vdc1 when the engine rotation speed is ωg2 and the generator rotation speed is ωg2', for example.

Then, in step S120 of FIG. 7, the capacitor voltage command-value Vdc* computing section 232 determines whether the driving force (torque) of the synchronous motor 100 satisfies demanded power Pm (=motor rotation speed ωm×torque command Tr*) when the synchronous motor 100 is driven at the extracted operating point, namely when it is driven with the output voltage and current of the generator being Vdc1 and Idc1, respectively. If "yes", the control flow proceeds to step S130, and if "no", the control flow proceeds to step S140.

If the operating point of the generator satisfies the demanded power, the DC voltage Vdc1 computing section 228 re-computes in step S130, regarding the DC voltage command value Vdc1, a voltage command value Vdc2 at which the synchronous motor 100 and the generator 14 operate with maximum efficiency. In other words, the motor control section 220 includes an efficiency map which is stored therein and represents efficiencies at various operating points of the generator (with respect to the engine rotation speed, the voltage and the current), and searches for a voltage at which the maximum efficiency is obtained, from the range of not smaller than the DC voltage command value Vdc1 and capable of outputting the motor demanded power. After the voltage command value Vdc2 has been computed, the capacitor voltage command-value Vdc* computing section 232 outputs a voltage command value Vdc* corresponding to the voltage command value Vdc2 to the generator control section 210. The generator control section 210 executes feedback control so that the capacitor voltage Vdc is matched with the voltage command value Vdc*.

On the other hand, if the operating point of the generator does not satisfy the demanded power, the DC voltage Vdc1 computing section 228 re-computes, in step S140, a voltage command value Vdc3 and a torque command value Tr* within the range capable of providing the demanded power. More specifically, if the generator cannot output the motor demanded power, the DC voltage Vdc1 computing section 228 first computes a motor torque command value that can be outputted by maximum power of the generator at the present engine rotation speed. Then, it computes a DC voltage command value required for providing that motor torque. In some cases, however, the computed DC voltage is lower than the induced voltage actually generated in the motor. In that case, the motor torque command value is reduced, and the DC voltage and the motor torque both capable of being actually outputted are finally decided. The torque command value Tr* is sent to the current command computing section 222. Then, the 3-phase voltage commands Vu*, Vv* and Vw* are computed again through the current command computing section 222, the voltage command computing section 224, and the 3-phase voltage command computing section 226. Also, the capacitor voltage command-value Vdc* computing section 232 outputs the voltage command value Vdc* corresponding to the voltage command value Vdc3 to the generator control section 210. The generator control section 210 executes feedback control so that the capacitor voltage Vdc is matched with the voltage command value Vdc*.

The control operation executed by the control unit for the electric four-wheel drive vehicle of this embodiment will be described below with reference to FIGS. 9A-9D.

Figure 9A:
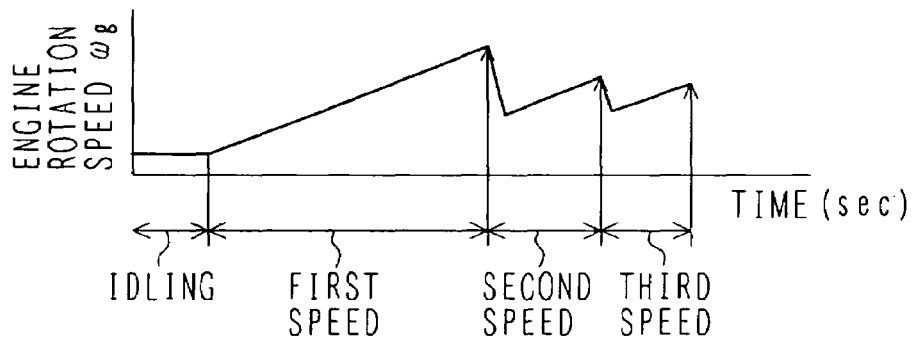
FIGS. 9A-9D are timing charts showing the control operation executed by the control unit for the electric four-wheel drive vehicle according to the first embodiment of the present invention.
Figure 9B:
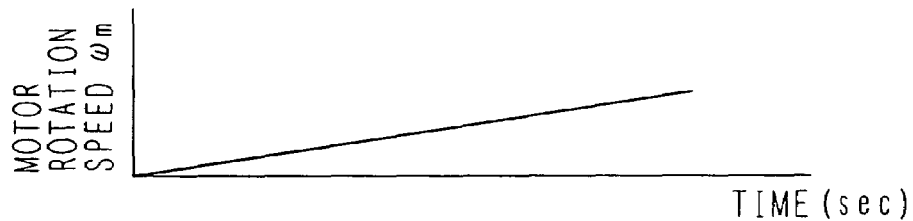
Figure 9C:
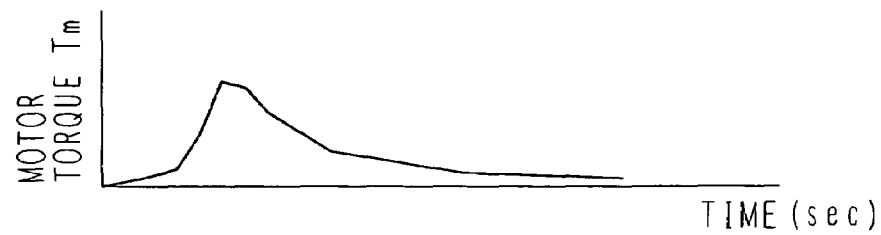
Figure 9D:
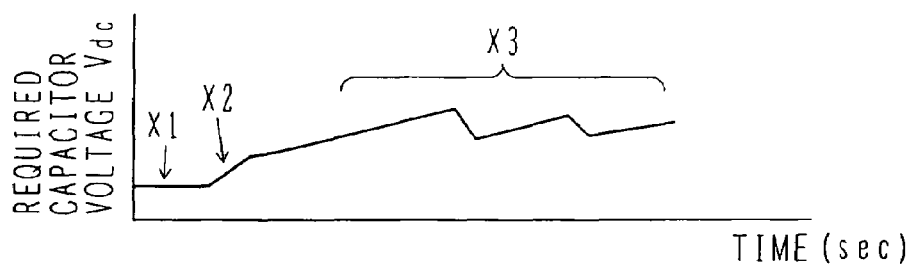

FIGS. 9A-9D are timing charts showing the control operation executed by the control unit for the electric four-wheel drive vehicle according to the first embodiment of the present invention. FIG. 9A represents the engine rotation speed ωg, and FIG. 9B represents the motor rotation speed ωm. FIG. 9C represents the motor torque Tm, and FIG. 9D represents the required capacitor voltage Vdc. In each timing chart, the horizontal axis represents time (sec).

As shown in FIG. 9A, the engine rotation speed ωg is increased and decreased as the shift change is made from idling to the first speed, to the second speed, and then to the third speed. On the other hand, as shown in FIG. 9B, the motor rotation speed ωm is monotonously increased. During the idling, because the electric four-wheel drive vehicle is not yet started, the required motor torque Tm is still small, but large torque is required at low speeds immediately after the start, as shown in FIG. 9C. Thereafter, as the vehicle speed increases, the required motor torque Tm decreases.

As shown in FIG. 9D, therefore, the required capacitor voltage Vdc is set to be low during the idling (around X1 in FIG. 9D), and the generator is started to operate, for example, near a point C in FIG. 8. In a low engine rotation speed range (around X2 in FIG. 9D) immediately after the start, the generator is operated at a low voltage and a large current near a point B in FIG. 8. When the engine rotation speed is further increased (around X3 in FIG. 9D), the generator is operated, for example, near a point A in FIG. 8 to increase the required capacitor voltage Vdc with priority paid to efficiency. By adjusting the required capacitor voltage Vdc depending on the engine rotation speed in such a manner, the required driving force can be produced with high efficiency.

A second system configuration of the control unit for the electric four-wheel drive vehicle of this embodiment will be described below with reference to FIG. 10.

Figure 10:
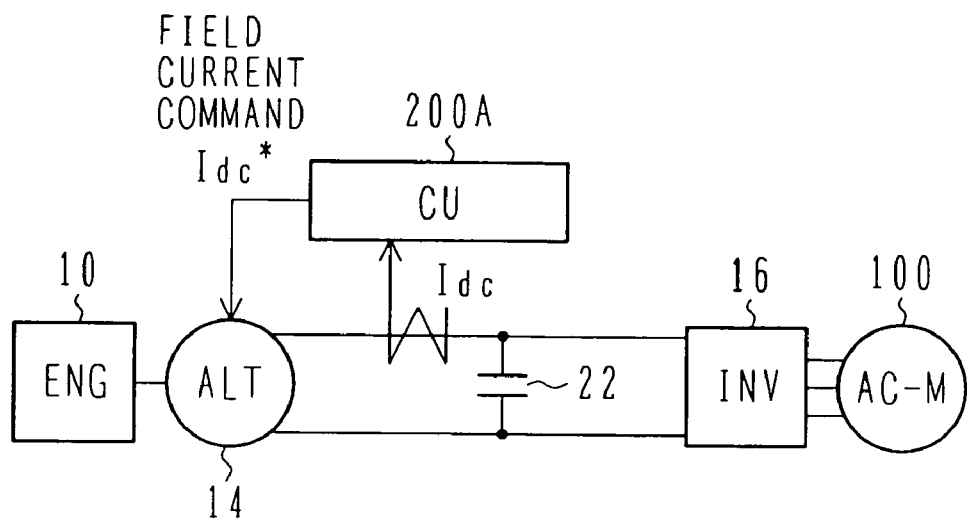
FIG. 10 is a block diagram showing a second system configuration of the control unit for the electric four-wheel drive vehicle according to the first embodiment of the present invention.

FIG. 10 is a block diagram showing the second system configuration of the control unit for the electric four-wheel drive vehicle according to the first embodiment of the present invention. The same reference numerals as those in FIGS. 1 and 4 denote the same components.

In the first system shown in FIG. 4, the field voltage at the field coils of the generator 14 is feedback controlled so that the voltage Vdc between both the terminals of the capacitor 22 is matched with the capacitor voltage command value Vdc* outputted from the motor control section 220.

On the other hand, in this second system, the field current at the field coils of the generator 14 is feedback controlled so that a DC current Idc (current generated by the generator) flowing through the DC bus is matched with a capacitor current command value Idc* outputted from a control unit 200A.

A third system configuration of the control unit for the electric four-wheel drive vehicle of the first embodiment will be described below with reference to FIG. 11.

Figure 11:
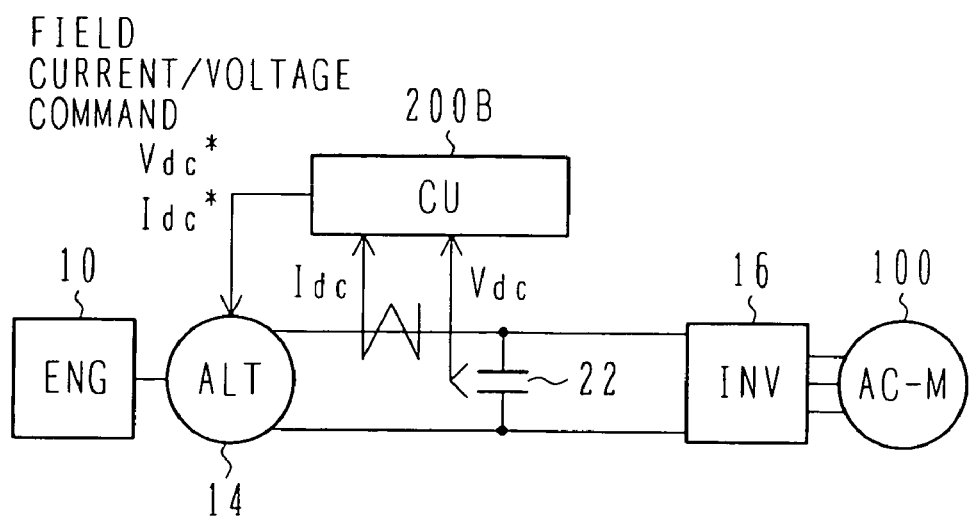
FIG. 11 is a block diagram showing a third system configuration of a control unit for the electric four-wheel drive vehicle according to the first embodiment of the present invention.

FIG. 11 is a block diagram showing the third system configuration of a control unit for the electric four-wheel drive vehicle according to the first embodiment of the present invention. The same reference numerals as those in FIGS. 1 and 4 denote the same components.

In this third system, the system shown in FIG. 4 and the system shown in FIG. 10 are combined with each other. More specifically, a control unit 200B feedback-controls the field voltage or current at the field coils of the generator 14 so that the voltage Vdc between both the terminals of the capacitor 22 or the DC current Idc (current generated by the generator) flowing through the DC bus is matched with the capacitor voltage command value Vdc* or the capacitor current command value Idc*, respectively. Which one of the voltage control and the current control is to be executed is selected depending on the operating range of the generator. The operating range of the generator can be determined by the process described above in connection with step S110 of FIG. 7.

The electric power generation characteristics of the generator are as shown in FIG. 8. The generator having the plotted characteristics is excited by self-excitation, and when the output voltage of the generator is reduced to a level lower than the voltage of the 12-V battery, it is separately excited. Looking at, e.g., the generator rotation speed ωg1' in FIG. 8, the electric power generation has a nonlinear characteristic such that a characteristic curve is descended toward the right from the point A to B, is descended toward the left from the point B to C, and is descended toward the right again after the point C. The voltage control and the current control are selectively changed over in order to stably control the generator having such an electric power generation characteristic.

Of the operating range of the electric power generation shown in FIG. 8, in the rightward descending zones (from the point A to B and after the point C), the voltage feedback control is executed, and in the leftward descending zone (from the point B to C), the current feedback control is performed. When the voltage feedback control system, shown in FIG. 4, is applied to the leftward descending zone in the operating range of the electric power generation shown in FIG. 8, the control system operates in positive logic and has a possibility of divergence. To keep stability of the control system in that zone, therefore, the sign of a compensation amount given as an output of the control unit has to be reversed. In contrast, in this third system, the current feedback control is executed in the leftward descending zone, and therefore stability of the control system can be kept with no need of reversing the sign of the compensation amount.

According to the first embodiment, as described above, the electric four-wheel drive system can be obtained which is applicable to cars of class having larger displacements without increasing the cost over that of the known mechanical four-wheel drive vehicle.

The construction of an electric four-wheel drive vehicle according to a second embodiment of the present invention will be described below with reference to FIGS. 12 and 13.

Figure 12:
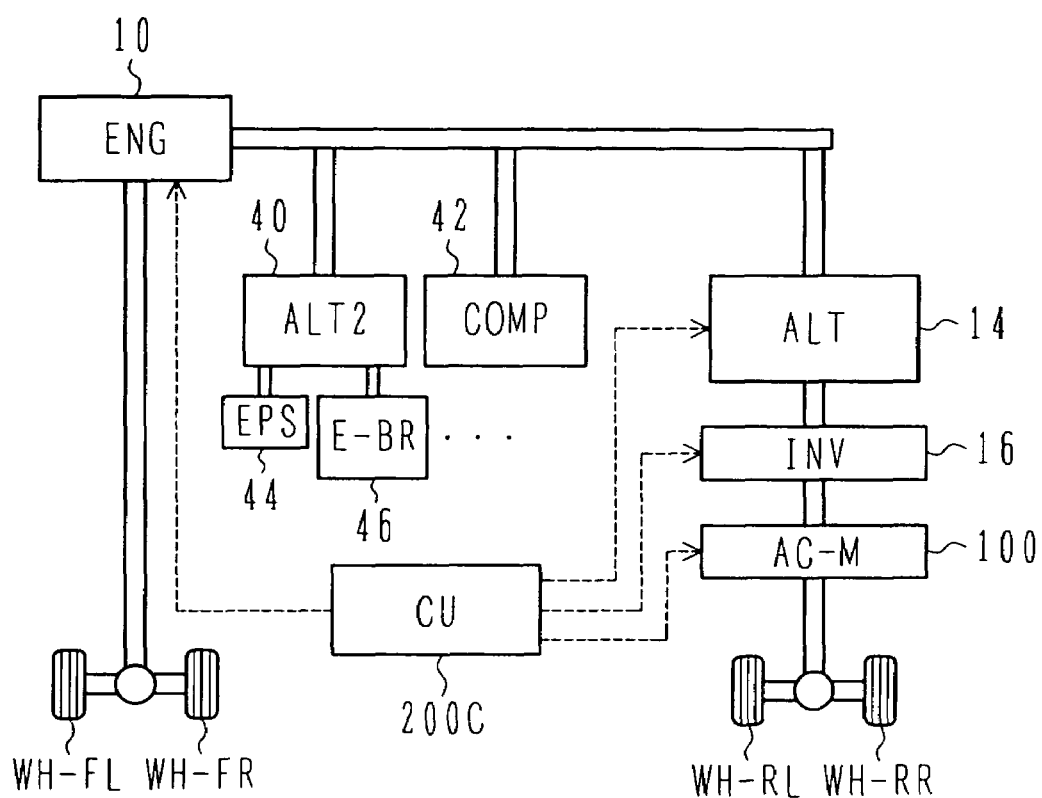
FIG. 12 is a schematic view showing the system configuration of an electric four-wheel drive vehicle according to a second embodiment of the present invention.

FIG. 12 is a schematic view showing the system configuration of the electric four-wheel drive vehicle according to the second embodiment of the present invention. FIG. 13 is a flowchart showing control procedures for the electric four-wheel drive vehicle according to the second embodiment of the present invention. In FIG. 12, the same reference numerals as those in FIG. 1 denote the same components.

As shown FIG. 12, an engine (ENG) 10 generates motive power for driving front wheels WH-FR and WH-FL, and is connected a generator (ALT2) 40 for a 12-V battery, a compressor (COMP) 42 for an air conditioner, and a 60-V high-voltage generator 14 as a motive power source for a synchronous motor (AC-M) 100 that drives rear wheels. In addition, an electric power steering (EPS) motor 44, an electric brake (E-BR) motor 46, etc. are also connected to the 12-V generator 40 in consideration of a recent trend toward electrical operation of various onboard actuators. That trend increases a load imposed on the 12-V generator 40. When performing the electric four-wheel driving, therefore, it is required to determine whether a rear-wheel motor output can be produced at a required level at the present engine rotation speed. In the electric four-wheel drive vehicle of this embodiment, an output of the motor 100 for driving the rear wheels is increased to a level of, e.g., about several tens kilowatts. Accordingly, in trying to take out maximum torque from the motor when the engine rotation speed is low and the engine is in a low output range, there is a possibility of an engine stall. In other words, with such an increase of motor capacity, it becomes more important to make load adjustment among various loads connected to the engine. For that reason, a control unit (CU) 200C in this embodiment executes management control of engine producible power and the various loads.

Figure 13:
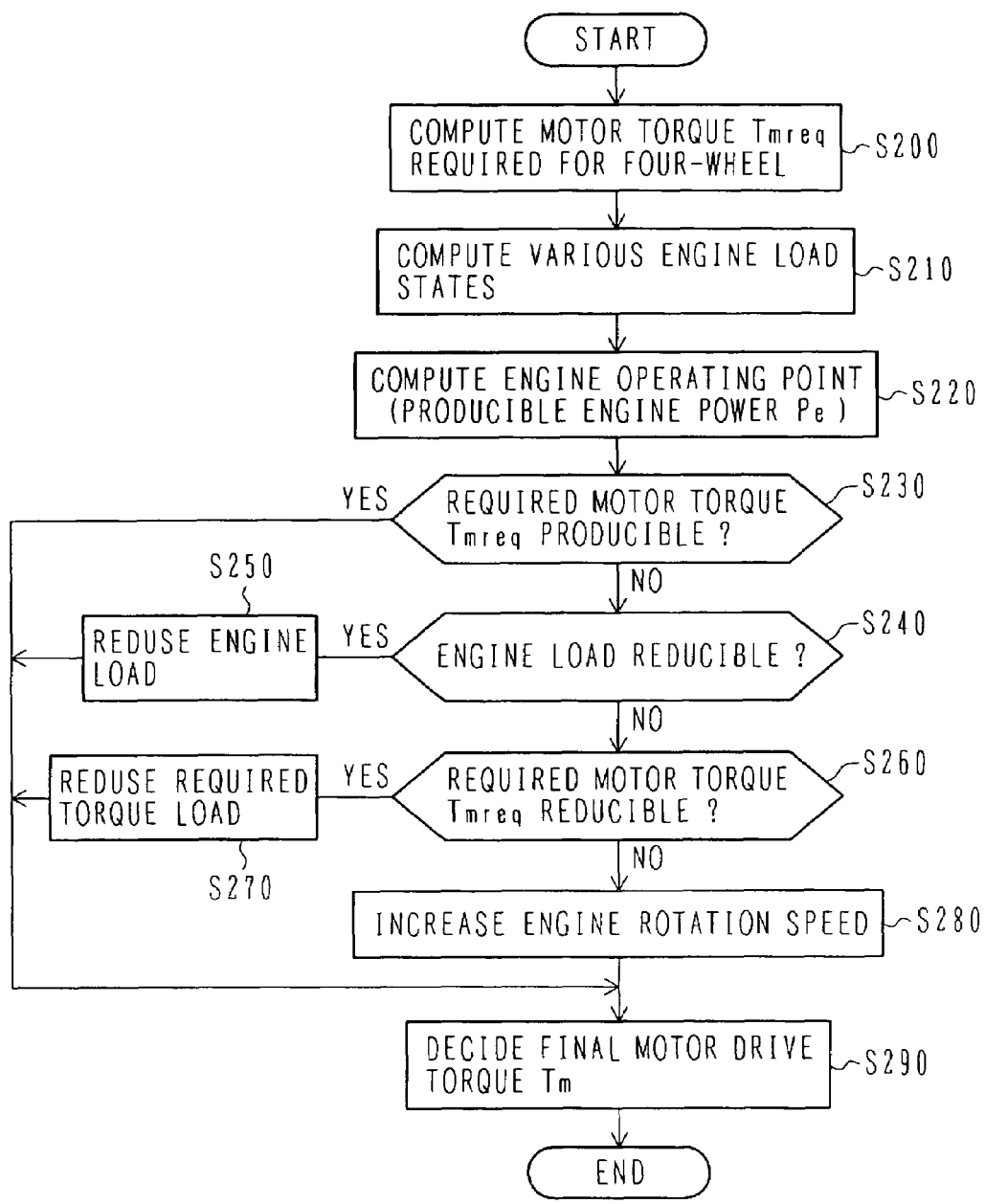
FIG. 13 is a flowchart showing control procedures for the electric four-wheel drive vehicle according to the second embodiment of the present invention.

In step S200 of FIG. 13, the control unit 200C computes required torque Tmreq of the synchronous motor 100, which is applied to the rear wheels WH-RR and WH-RL when the four-wheel driving is performed. The required torque Tmreq can be obtained from an accelerator opening (throttle opening) and a vehicle speed or from the accelerator opening (throttle opening) and rotation speeds of the front and rear wheels.

Then, in step S210, the control unit 200C computes present output states of various loads connected to the engine 10 (including not only the generator 40 for the 12-V battery and the compressor 42 for the air conditioner, but also other loads (such as the electric power steering motor 44 and the electric brake motor 46)) which are additionally connected to the generator 40 for the 12-V battery.

Then, in step S220, the control unit 200C computes producible power Pe in accordance with the present operating point of the engine 10.

Then, in step S230, the control unit 200C determines whether the required torque Tmreq computed in step S200 can be outputted with the producible power Pe. If "yes", the control flow proceeds to step S290 where the control unit 200C sets the required torque Tmreq to actual motor drive torque Tm.

If it is determined in step S230 that the required torque Tmreq cannot be outputted with the producible power Pe, the control unit 200C determines in step S240 whether the load imposed on the engine 10 from other one or more loads than the rear-wheel driving motor 100 can be reduced. If it is determined in step S240 that the engine load can be reduced, the control unit 200C reduces the engine load in step S250. If the motor required torque Tmreq can be outputted as a result of reducing the engine load, the control unit 200C sets the required torque Tmreq to the actual motor drive torque Tm in step S290.

If it is determined in step S240 that the engine load cannot be reduced, the control unit 200C determines in step S260 whether the required torque Tmreq can be reduced in consideration of the four-wheel drive performance.

If the required torque Tmreq can be reduced in consideration of the four-wheel drive performance, the control unit 200C reduces the motor torque Tm to a level capable of being outputted with the present engine producible power Pe. Then, the control unit 200C sets that reduced torque to actual motor drive torque Tm in step S290.

If it is determined in step S260 that the four-wheel drive performance is essential in the present running state and the required torque Tmreq cannot be reduced, the control unit 200C increases the engine rotation speed in step S270 in the range capable of outputting the required torque Tmreq.

Then, in step S290, the control unit 200C decides the final motor drive torque Tm as a result of the above-described process.

The foregoing is one example of the power management process for the electric four-wheel drive system. The sequence and others in the above-described process are not limited to the described ones. Also, the power management process in this embodiment is intended to effectively operate the electric four-wheel drive system while driving the engine at the operating point with high efficiency. So long as that intention is achieved, practical processing procedures are not limited to those ones of the flowcharts shown in FIG. 13.

Thus, according to this embodiment, the electric four-wheel drive system can be obtained which is applicable to cars of class having larger displacements without increasing the cost over that of the known mechanical four-wheel drive vehicle.

The structure of a field-coil synchronous motor used in the electric four-wheel drive vehicle of the present invention will be described below with reference to FIGS. 14-22.

First, the overall structure of a first field-coil synchronous motor used in the electric four-wheel drive vehicle of the present invention will be described below with reference to FIG. 14.

Figure 14:
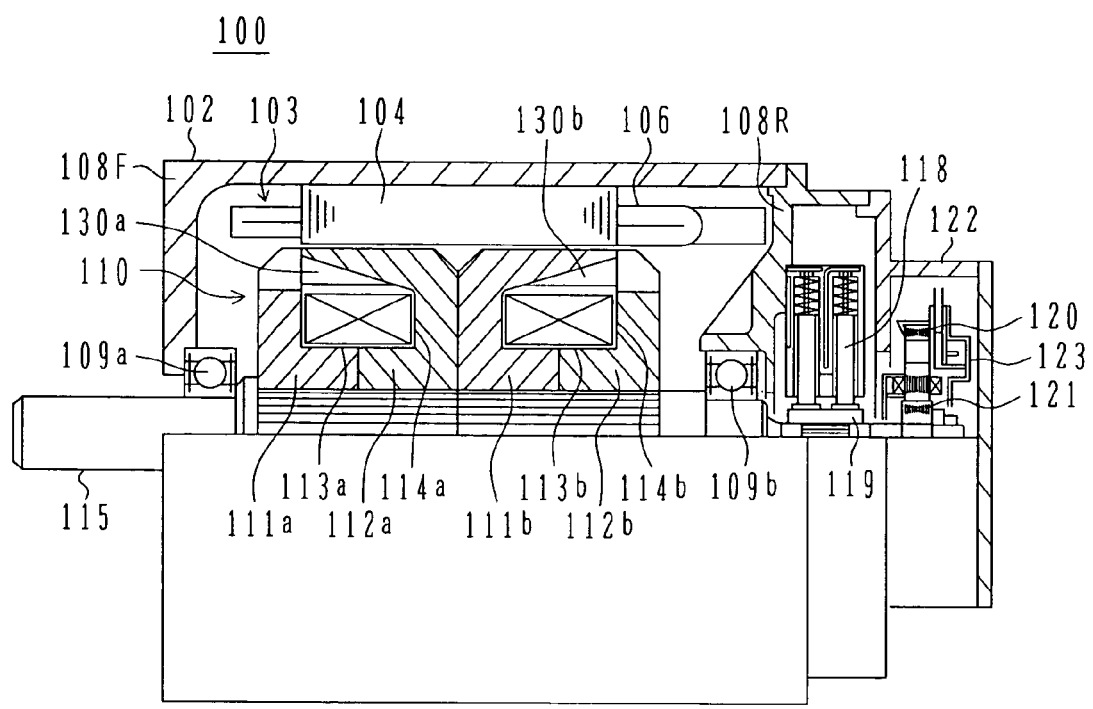
FIG. 14 is a sectional view showing the overall structure of a first field-coil synchronous motor used in the electric four-wheel drive vehicle of the present invention.

FIG. 14 is a sectional view showing the overall structure of the first field-coil synchronous motor used in the electric four-wheel drive vehicle of the present invention.

A field-coil synchronous motor 100 is the tandem type that two units of rotors rotatably supported inside a stator are fitted over the same shaft (output shaft).

A housing 102 includes a bearing bracket 108F to which a front bearing 109a is fixes, a bearing bracket 108R to which a rear bearing 109b is fixed, and a resolver bracket 122 in which a pole position sensor 120-121 (e.g., a resolver) is accommodated. The bearing bracket 108R consists of a front bracket and a housing integrally. A bracket accommodating a front bearing 109a is formed integrally with the housing 102. A shaft 115 extends through respective centers of both the brackets and is supported by the front bearing 109a and the rear bearing 109b. Pair of slip rings 119 is fitted over one end of the shaft 115.

A stator 103 and a rotor 110 are disposed inside the housing 102. The stator 103 comprises a stator core 104 and a stator coil 106. The stator core 104 is fixedly fitted to an inner periphery of the housing 102. The stator coil 106 is accommodated in slots of the stator core 104.

At the inner peripheral side of the stator core 104, the rotor 110 is rotatably supported by both the bearings 109a and 109b with a mechanical gap (air gap length) left between the stator core and the rotor. The rotor 110 is made up of claw poles 111*a*, 112*a*, 111*b* and 112*b*, field coils 113*a* and 113*b*, and permanent magnets 130*a* and 130*b*. The claw poles 111*a* and 112*a*, the field coil 113*a*, and the permanent magnet 130*a* constitute a first rotor. The claw poles 111*b* and 112*b*, the field coil 113*b*, and the permanent magnet 130*b* constitute a second rotor. The pair of claw poles 111*a* and 112*a* are arranged such that claws of one claw pole are positioned between claws of the other claw pole in opposite relation (see FIG. 19). Similarly, the pair of claw poles 111*b* and 112*b* are arranged such that claws of one claw pole are positioned between claws of the other claw pole in opposite relation. A bobbin 114*a* is assembled between the claw poles 111*a* and 112*a*, and a bobbin 114*b* is assembled between the claw poles 111*b* and 112*b*. The field coils 113*a* and 113*b* are wound respectively over the bobbins 114*a* and 114*b*. The permanent magnets 130*a* and 130*b* are disposed in plural respectively between the pair of claw poles 111*a* and 112*a* and between the pair of claw poles 111*b* and 112*b*. Brushes 118 are attached to be slidable with the two slip rings 119 in one to one relation. A DC current from a battery is supplied to the field coils 113*a* and 113*b* through the slip rings 119.

The claw poles 111*a* and 112*a* are excited into N and S poles alternately in the circumferential direction by the field coil 113*a* through the brush 118. The claw poles 111*b* and 112*b* are also excited into N and S poles alternately in the circumferential direction by the field coil 113*b* through the brush 118. The claw poles arranged in tandem are excited to have the same polarity at the side where both the claw poles are adjacent to each other. Also, the permanent magnets 130*a* and 130*b* are each magnetized to have the same polarity as that of one surface of the pair of claw poles, which is positioned opposite to the relevant permanent magnet, the polarity being decided by excitation of the corresponding field coil.

When one of the two claw-pole rotors arranged in tandem is shifted in the circumferential direction relative to the other, a reference point for positioning of the pole position sensor (resolver) 120-121 is aligned with the center of the shifted rotors or with the resultant waveform of respective induced voltages in the shifted rotors.

A resolver stator 120 is accommodated in the resolver bracket 122. A resolver rotor 121 is fitted over an end of the shaft 115 with a mechanical gap (air gap length) left between the resolver stator 120 and the resolver rotor 121. Further, a cover 123 is attached to the resolver bracket 122. By removing the cover 123, the position of the resolver stator 120 can be adjusted as required.

The layout of the stator coil within a slot in the first field-coil synchronous motor used in the electric four-wheel drive vehicle of this embodiment will be described below with reference to FIGS. 15 and 16.

Figure 15:
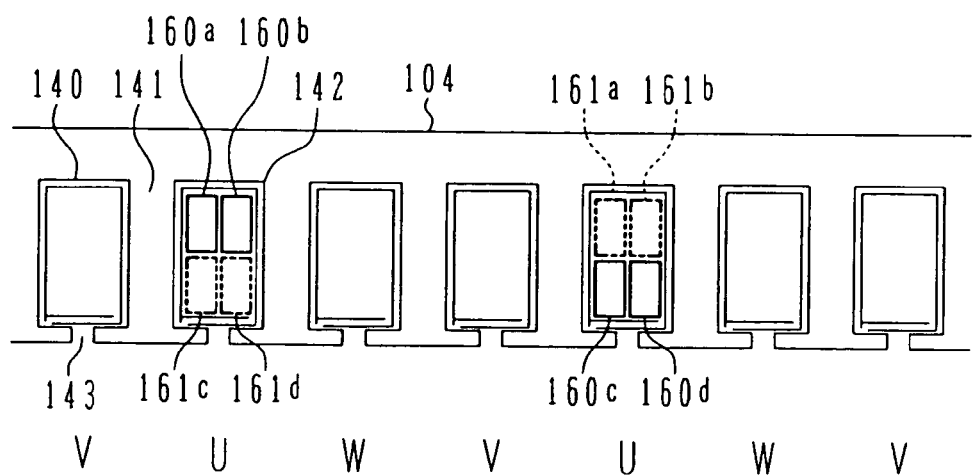
FIG. 15 is a developed sectional view showing the layout of a stator coil within a slot in the first field-coil synchronous motor used in the electric four-wheel drive vehicle of the present invention.
Figure 16:
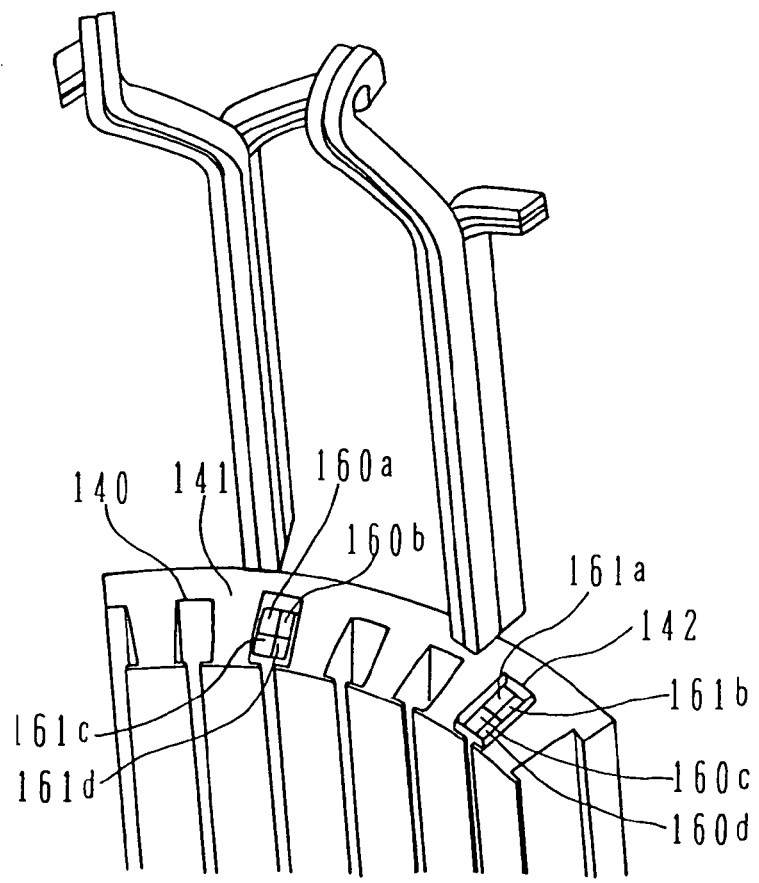
FIG. 16 is a perspective view showing the state of the stator coil being inserted in the slot in the first field-coil synchronous motor used in the electric four-wheel drive vehicle of the present invention.

FIG. 15 is a developed sectional view showing the layout of the stator coil within a slot in the first field-coil synchronous motor used in the electric four-wheel drive vehicle of the present invention. FIG. 16 is a perspective view showing the state of the stator coil being inserted in the slot in the first field-coil synchronous motor used in the electric four-wheel drive vehicle of the present invention.

A plurality of slots 140 and a plurality of teeth 141 are formed in the stator core 104. Each slot 140 has a slot opening 143 formed in its inner peripheral surface that faces the claw poles 111*a*, 112*a*, 111*b* and 112*b*. In the illustrated example, four conductors are arranged in one slot.

Looking at the U-phase in the case of 12 poles and 36 slots, for example, a conductor 160*a* arranged in the outer peripheral side of one slot 140 and a conductor 160*c* arranged in the inner peripheral side of another slot spaced from the one slot with two slots interposed between them are formed as one conductor. Similarly, a conductor 160*b* arranged in the outer peripheral side of the one slot 140 and a conductor 160*d* arranged in the inner peripheral side of the other slot spaced from the one slot with two slots interposed between them are formed as one conductor. In such a way, the in-slot conductors 160*a* and 160*b* are successively connected to corresponding conductors at positions spaced per pole pitch such that those conductors are connected in series from the start of winding to the end of winding, thereby constituting a first coil 160 (see FIG. 17) with wave winding. Also, conductors 161*c* and 161*d* arranged in the one slot 140 and conductors 161*a* and 161*b* arranged in another slot spaced from the one slot with two slots interposed between them are formed respectively as one conductor. Thus, the in-slot conductors 161*c* and 161*d* are similarly connected in series from the start of winding to the end of winding, thereby constituting a second coil 161 (see FIG. 17) with wave winding. Further, the first coil and the second coil are connected in parallel between respective terminals at the start of winding and between respective terminals at the end of winding which constitutes a neutral point 162 (see FIG. 17). Additionally, a sheet of thin insulating paper 142 is disposed in each slot.

The stator coil in one slot is formed by two-layer winding of the conductors 160*a*, 160*b* in the upper (outer peripheral) side and the conductors 161*c*, 161*d* in the lower (inner peripheral) side. The number of conductors arranged in one slot in the circumferential direction is 2 when two pairs of claw poles are disposed in tandem. When three pairs of claw poles are disposed in tandem, the number of conductors arranged in one slot in the circumferential direction is 3.

The layout of 1-phase coils of the stator coil in the first field-coil synchronous motor used in the electric four-wheel drive vehicle of this embodiment will be described below with reference to FIG. 17.

Figure 17:
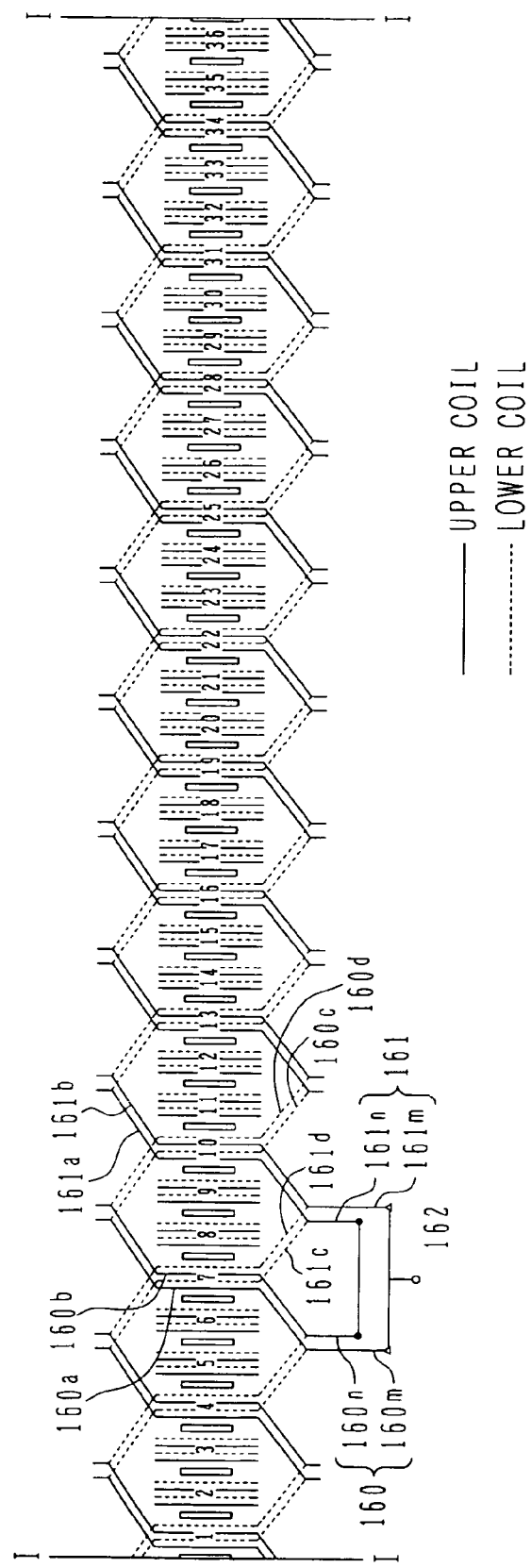
FIG. 17 is a developed view showing the layout of 1-phase coils of the stator coil in the first field-coil synchronous motor used in the electric four-wheel drive vehicle of the present invention.

FIG. 17 is a developed view showing the layout of 1-phase coils of the stator coil in the first field-coil synchronous motor used in the electric four-wheel drive vehicle of the present invention. In FIG. 17, a solid line represents the upper coil and a broken line represents the lower coil.

FIG. 17 illustrates the layout of 1-phase coils when the conductors arranged in 36 slots as described above are shown in the developed form. As seen, the first coil and the second coil constituted respectively by the conductors 160 and 161 are each formed by connecting the conductors in series and then connected in parallel, to thereby form a U-phase terminal and the neutral terminal 162.

More specifically, looking at the U-phase in the case of 12 poles and 36 slots, for example, upper coil conductors 160*a* and 160*b* arranged in the seventh slot and lower coil conductors 160*c* and 160*d* arranged in the tenth slot are formed respectively as one conductor. A start conductor 160*m* of winding is positioned in the lower side of the fourth slot, and that conductor is wound so as to pass the upper side of the first slot, the lower side of the 34-th slot, . . . , and the upper side of the seventh slot, thereby forming a coil with one winding. The same conductor is further wound in series until reaching an end conductor 160*n* of the winding after twice wave winding. Similarly, a start conductor 161*m* of winding is positioned in the upper side of the tenth slot, and that conductor is wound so as to pass the lower side of the thirteenth slot, the upper side of the sixteenth slot, . . . , and the lower side of the seventh slot, thereby forming a coil with one winding. The same conductor is further wound in series until reaching an end conductor 161*n* of the winding after twice wave winding. The winding end conductor 160*n* and the winding end conductor 161*n* are connected to the neutral point 162, and the winding start conductor 160m and the winding start conductor 161m are connected in parallel, whereby the U-phase coil is formed.

The connected state of 3-phase coils of the stator coil in the first field-coil synchronous motor used in the electric four-wheel drive vehicle of this embodiment will be described below with reference to FIG. 18.

Figure 18:
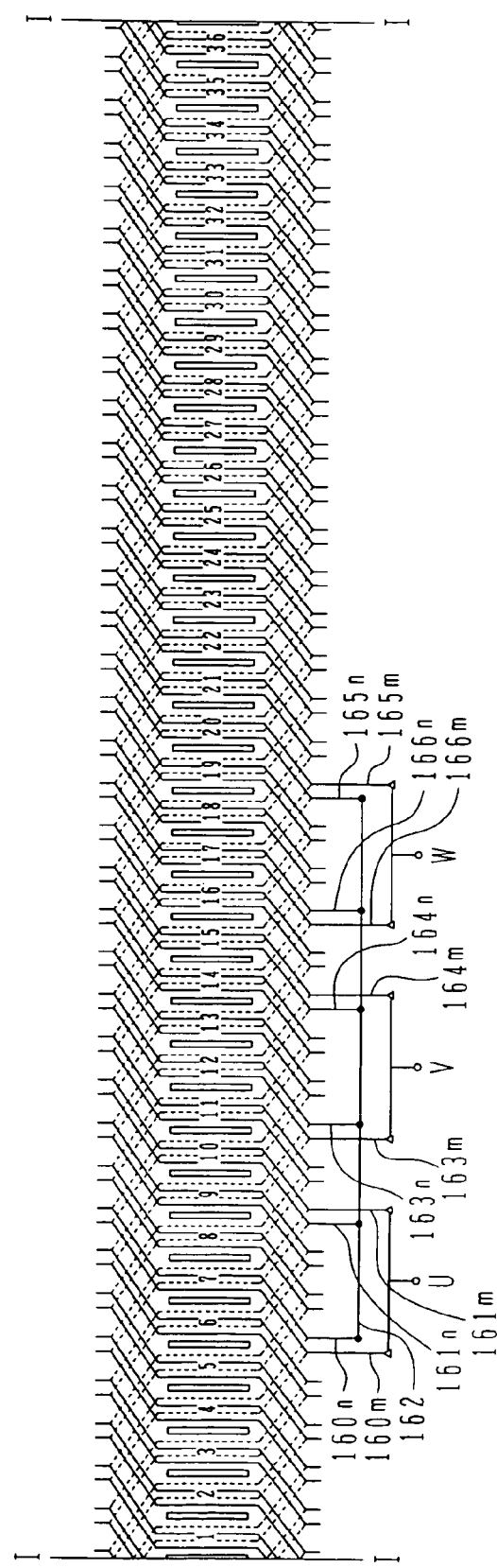
FIG. 18 is a developed view showing the connected state of 3-phase coils of the stator coil in the first field-coil synchronous motor used in the electric four-wheel drive vehicle of the present invention.

FIG. 18 is a developed view showing the connected state of 3-phase coils of the stator coil in the first field-coil synchronous motor used in the electric four-wheel drive vehicle of the present invention.

FIG. 18 illustrate the connected state of 3-phase coil conductors in which respective conductors of V- and W-phase coils are added to the connected state of the U-phase coil conductors described above with reference to FIG. 17. As in the U-phase coil, winding end conductors 163n and 164n of the V-phase coil are connected to the neutral point 162, and winding start conductors 163m and 164m of the V-phase coil are connected in parallel, whereby the V-phase coil is formed. Also, winding end conductors 165n and 166n of the W-phase coil are connected to the neutral point 162, and winding start conductors 165m and 166m of the W-phase coil are connected in parallel, whereby the W-phase coil is formed.

The structure of the rotor in the first field-coil synchronous motor used in the electric four-wheel drive vehicle of this embodiment will be described below with reference to FIG. 19.

Figure 19:
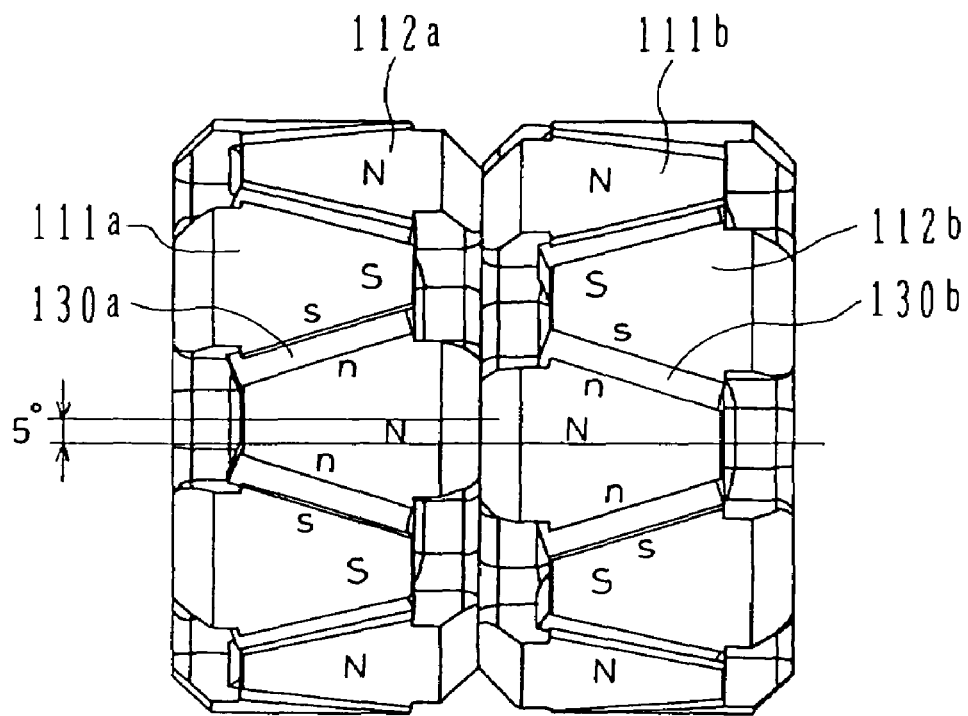
FIG. 19 is a plan view showing the structure of a rotor in the first field-coil synchronous motor used in the electric four-wheel drive vehicle of the present invention.

FIG. 19 is a plan view showing the structure of the rotor in the first field-coil synchronous motor used in the electric four-wheel drive vehicle of the present invention. The same reference numerals as those in FIG. 14 denote the same components.

In this rotor structure, two claw-pole rotors are arranged in tandem while shifting pole centers such that the centers of the claw poles 111a and 112a are shifted respectively from the centers of the claw poles 112b and 112a by a mechanical angle of (360° (degrees)/(number of poles×number of phases×Ns))=5° (degrees) in the circumferential direction. Here, Ns represents the number of conductors arranged in the same slot in the circumferential direction and connected in series; namely it represents the number of units of rotors arranged in tandem, which comprise pairs of claw poles axially disposed side by side. In other words, when the number of conductors arranged in the same slot in the circumferential direction is 2, two pairs of claw poles are arranged in tandem.

Further, when the number of conductors arranged in the same slot in the circumferential direction is 3, Ns=3 is set and three pairs of claw poles are arranged in tandem. In this case, a first pole pair constituted by two claw poles 111a and 112a is fixed, and while setting the center of a second pole pair constituted by two claw poles 111b and 112 b as a reference, the center of a third pole pair constituted by other two claw poles is advanced or retarded in the circumferential direction.

In the example shown in FIG. 19, because of the tandem structure with 12 poles, 36 slots and 3 phases, the pole centers are mechanically shifted 5° from each other in the circumferential direction. In the case of the tandem structure with 16 poles, 48 slots and 3 phases, the angle at which the pole centers are mechanically shifted from each other in the circumferential direction is 3.75°.

The waveforms of induced voltages in the tandem rotor shown in FIG. 19 will be described below with reference to FIG. 20.

Figure 20:
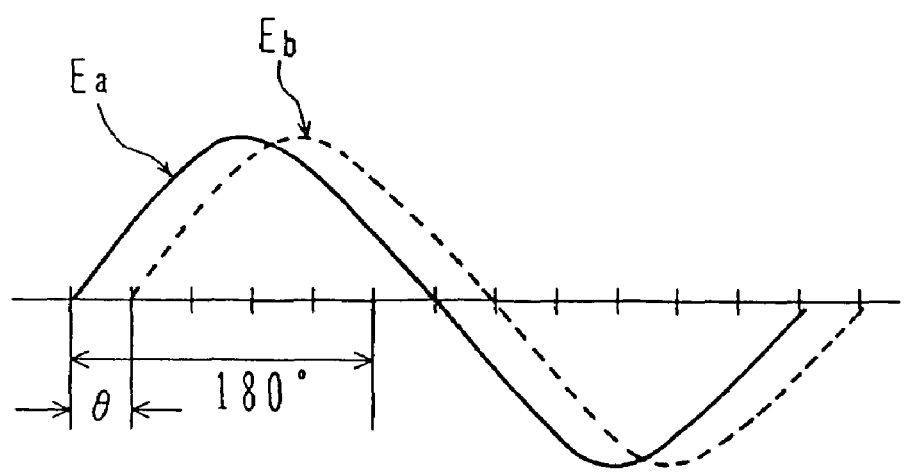
FIG. 20 is a graph showing the waveforms of induced voltages in a tandem rotor shown in FIG. 19.

FIG. 20 is a graph showing the waveforms of induced voltages in the tandem rotor shown in FIG. 19.

When the pole centers of two rotors in tandem are shifted 5° from each other in the circumferential direction as shown in FIG. 19, assuming the induced voltage in the first rotor to be Ea, the induced voltage in the second rotor having the pole center shifted 5° from that of the first rotor in the circumferential direction is given as Eb. Stated another way, in the case of 12 poles and 3 phases, the mechanical pole center shift of 5° in the circumferential direction results in a shift of 30° in phase of an electrical angle.

The connected state of the 3-phase coils of the stator coil in the first field-coil synchronous motor used in the electric four-wheel drive vehicle of this embodiment will be described below with reference to FIG. 21.

Figure 21:
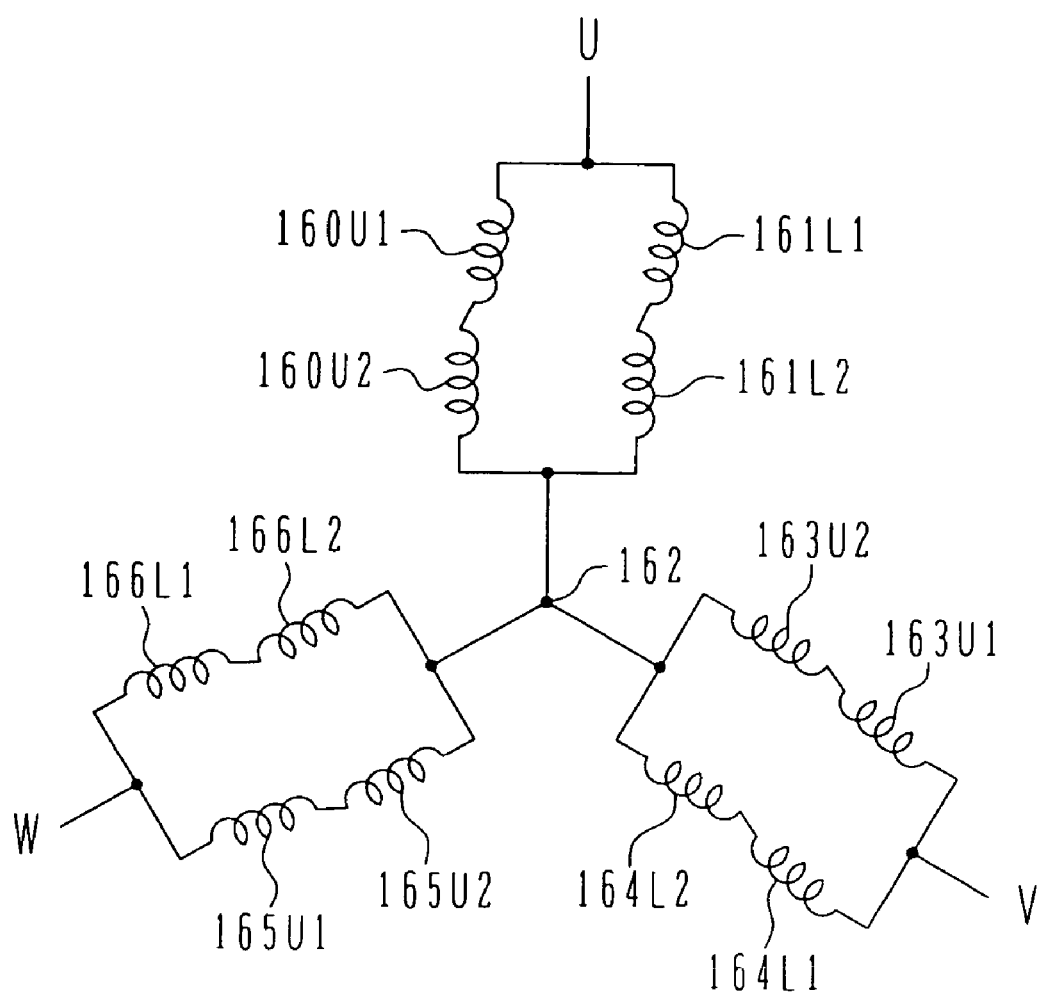
FIG. 21 is a developed view showing the connected state of 3-phase coils of the stator coil in the first field-coil synchronous motor used in the electric four-wheel drive vehicle of the present invention.

FIG. 21 is a developed view showing the connected state of the 3-phase coils of the stator coil in the first field-coil synchronous motor used in the electric four-wheel drive vehicle of the present invention.

The U-, V- and W-phase coils are formed by connecting in series the conductors arranged in the respective slots in the manner described above, while one of two pairs of claw poles in tandem is shifted from the other by a mechanical angle of 5° (i.e., an electrical angle of 30°). Therefore, the voltages induced upon intersecting magnetic fluxes of the respective pairs of claw poles have a phase difference of 30° in terms of electrical angle.

More specifically, looking at the U-phase stator coil, the voltage generated in an upper stator coil 160U2 of a second rotor of two rotors in tandem is shifted 30° in phase of electrical angle from the voltage generated in an upper stator coil 160U1 of a first rotor thereof. The state shown in FIG. 21 shows the voltage having different in phase by a vector. Likewise, the voltage generated in a lower stator coil 160L2 of the second rotor of the two rotors in tandem is also shifted 30° in phase of electrical angle from the voltage generated in a lower stator coil 160L1 of the first rotor thereof.

A reduction of vibrations in the first field-coil synchronous motor used in the electric four-wheel drive vehicle of this embodiment will be described below with reference to FIGS. 22 and 23.

Figure 22A:
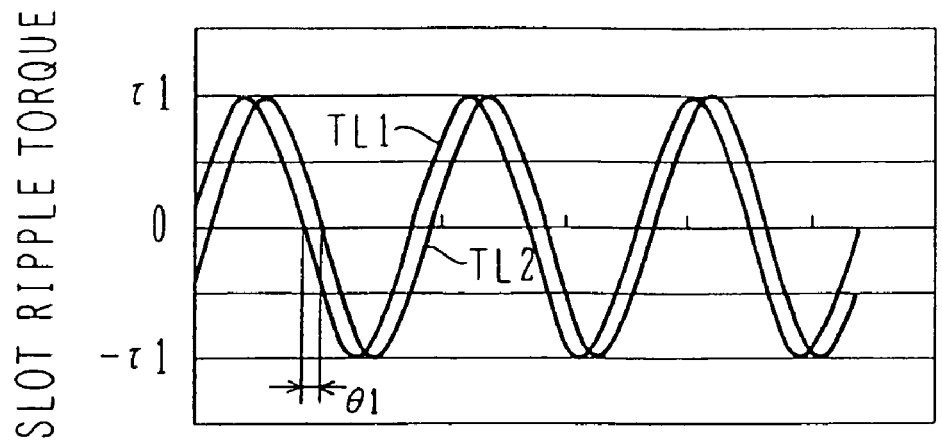
FIGS. 22A and 22B are charts for explaining a reduction of vibrations (ripples) in the first field-coil synchronous motor used in the electric four-wheel drive vehicle of the present invention.
Figure 22B:
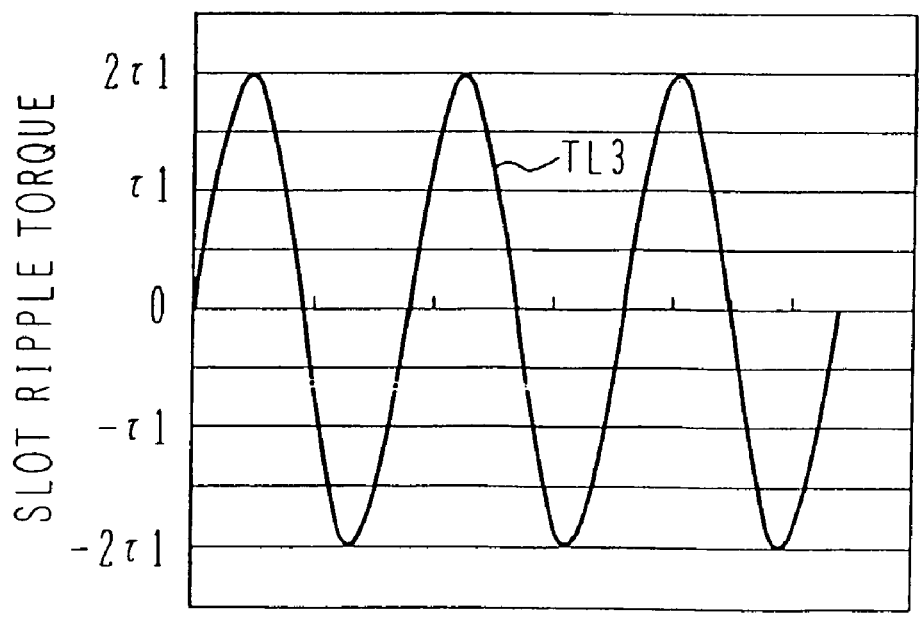
Figure 23A:
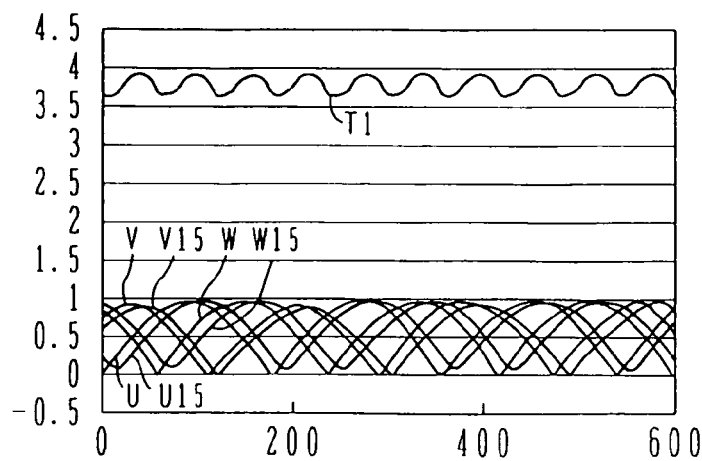
FIGS. 23A-23C are charts for explaining a reduction of pulsations in the first field-coil synchronous motor used in the electric four-wheel drive vehicle of the present invention.
Figure 23B:
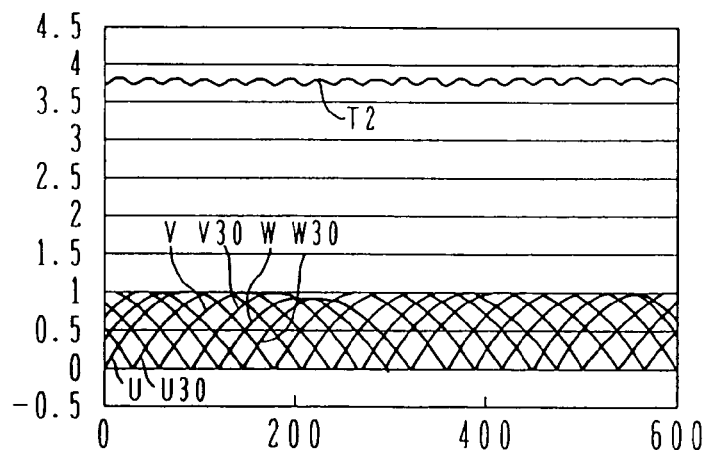
Figure 23C:
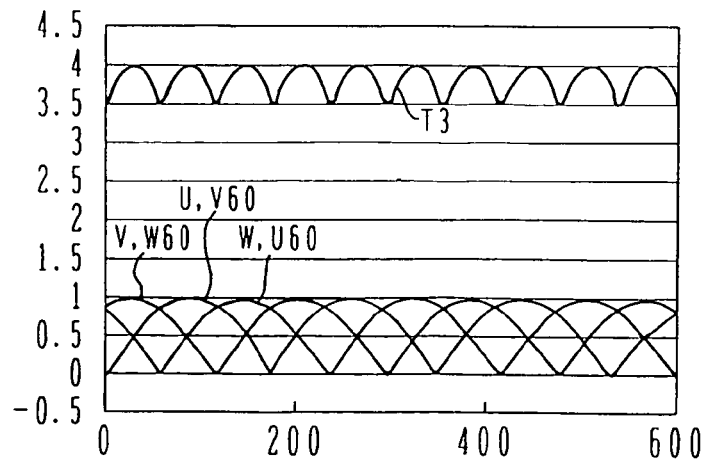

FIGS. 22A and 22B are charts for explaining a reduction of vibrations (ripples) in the first field-coil synchronous motor used in the electric four-wheel drive vehicle of the present invention. FIGS. 23A-23C are charts for explaining a reduction of pulsations in the first field-coil synchronous motor used in the electric four-wheel drive vehicle of the present invention.

Referring to FIGS. 22A and 22B, FIG. 22A represents a torque ripple in this embodiment, and FIG. 22B represents a torque ripple in the prior art.

When one of the two pairs of claw poles in tandem is shifted from the other by a mechanical angle of 5° (i.e., an electrical angle of 30°) as in this embodiment, a torque ripple TL1 caused by a first claw-pole pair and a torque ripple TL2 caused by a second claw-pole pair appear with a shift of angle θ1 (30° in terms of electrical angle), as shown in FIG. 22A. Respective maximum values of those torque ripples in this case are equal to each other and are assumed to be τ1.

On the other hand, FIG. 22B represents a torque ripple TL3 resulting when the pole centers of the two pairs of claw poles in tandem are not shifted from each other. In this case, the two pairs of claw poles in tandem, which are not shifted from each other in the circumferential direction, act all over the length of the stator core, and a maximum value of the torque ripple TL3 is 2τ1.

Thus, according to this embodiment, because the first and second pole pairs of the claw poles in tandem are relatively shifted 30° in terms of electrical angle, the axial length of the claw poles acting as a unit is half of that when both the pole pairs are not shifted in the circumferential direction, and therefore the generated torque ripple is halved from that when the pole centers of the two pairs of claw poles in tandem are not shifted from each other (i.e., $2\tau 1 \rightarrow \tau 1$). Stated another way, by shifting the pole centers of the two pairs of claw poles in tandem from each other in the circumferential direction as in this embodiment, the torque ripple is reduced from $2\tau 1$ to $\tau 1$ and an impact force can also be halved. Since vibrations and noises depend on the impact force, it is possible to reduce vibrations and noises to half by shifting one of the two pairs of claw poles in tandem from the other.

A reduction of pulsations will be described below with reference to FIGS. 23A-23C. FIG. 23A corresponds to the case where the first and second pole pairs of the claw poles in tandem are relatively shifted 15° in terms of electrical angle, and it represents a U-phase torque pulsation U of the first pole pair, a U-phase torque pulsation U15 of the second pole pair which is shifted 15° in terms of electrical angle from the first pole pair, a V-phase torque pulsation V of the first pole pair, a V-phase torque pulsation V15 of the second pole pair which is shifted 15° in terms of electrical angle from the first pole pair, a W-phase torque pulsation W of the first pole pair, a W-phase torque pulsation W15 of the second pole pair which is shifted 15° in terms of electrical angle from the first pole pair, and a resultant torque pulsation T1 obtained by combining those six torque pulsations together.

FIG. 23B corresponds to the case where the first and second pole pairs of the claw poles in tandem are relatively shifted 30° in terms of electrical angle as in this embodiment, and it represents a U-phase torque pulsation U of the first pole pair, a U-phase torque pulsation U30 of the second pole pair which is shifted 30° in terms of electrical angle from the first pole pair, a V-phase torque pulsation V of the first pole pair, a V-phase torque pulsation V30 of the second pole pair which is shifted 30° in terms of electrical angle from the first pole pair, a W-phase torque pulsation W of the first pole pair, a W-phase torque pulsation W30 of the second pole pair which is shifted 30° in terms of electrical angle from the first pole pair, and a resultant torque pulsation T2 obtained by combining those six torque pulsations together.

FIG. 23C corresponds to the case where the first and second pole pairs of the claw poles in tandem are relatively shifted 60° in terms of electrical angle, and it represents a U-phase torque pulsation U of the first pole pair, a U-phase torque pulsation U60 of the second pole pair which is shifted 60° in terms of electrical angle from the first pole pair, a V-phase torque pulsation V of the first pole pair, a V-phase torque pulsation V60 of the second pole pair which is shifted 60° in terms of electrical angle from the first pole pair, a W-phase torque pulsation W of the first pole pair, a W-phase torque pulsation W60 of the second pole pair which is shifted 60° in terms of electrical angle from the first pole pair, and a resultant torque pulsation T3 obtained by combining those six torque pulsations together.

Thus, when the field-coil generator-motor is operated as a motor, the total torque pulsation of the motor can be minimized by setting the shift angle of one of the two pairs of claw poles in tandem from the other to 30° in terms of electrical angle as shown in FIG. 23B. Also, when the field-coil generator-motor is operated as a generator and an output voltage is subjected to full-wave rectification, the pulsation of the voltage waveform can be minimized by setting the shift angle of one of the two pairs of claw poles in tandem from the other to 30° in terms of electrical angle. In other words, by shifting one of the two pairs of claw poles in tandem from the other at a mechanical angle of 5° (i.e., an electrical angle of 30°), it is possible to not only reduce the pulsations of 3-phase AC pulsating waveforms, but also to suppress the vibrations and noises.

The torque ripples can also be reduced to suppress the vibrations and noises by shifting one of the two pairs of claw poles in tandem from the other at an angle other than 30° in terms of electrical angle. In such a case, however, the pulsations of 3-phase AC pulsating waveforms are increased to some extent in comparison with the case of setting the shift to 30° in terms of electrical angle.

Table 1, give below, lists the relationships among the number of slots, the mechanical angle, and the electrical angle when the number of poles of a Lundell-type tandem rotary electric machine is changed. In the case of a tandem rotor including Ns units of rotors, the mechanical angle is given by 360/(number of poles×number of phases×Ns).

TABLE 1

| Item | Number of poles | | | | | |
| --- | --- | --- | --- | --- | --- | --- |
| | 6 | 8 | 10 | 12 | 14 | 16 |
| Number of stator slots | 18 | 24 | 30 | 36 | 42 | 48 |
| Mechanical angle of shift of tandem poles (°) | 10 | 7.5 | 6 | 5 | 4.286 | 3.75 |
| Electrical angle of shift of tandem poles (°) | 30 | 30 | 30 | 30 | 30 | 30 |

As one known example of the field-coil synchronous motor using claw poles, JP,A 2001-169490 discloses a stator coil in which the number of slots is increased, conductors arranged in two adjacent slots in a distributed manner are connected in series, and conductors arranged in other adjacent slots in a distributed manner are also connected in series, followed by connecting those conductors in parallel. With that stator coil, however, because the number of slots is increased and the area required for ground insulation is increased, the occupancy rate of the conductors is reduced. Further, in trying to increase motor torque, the tandem arrangement is required. For those reasons, the disclosed stator coil is disadvantageous when it is desired to make the sectional areas of the conductors as large as possible.

Generally, a rotary electric machine used in an electric four-wheel drive vehicle is required to have a wide range of rotation speed control from low-speed to high-speed operations because the rotary electric machine is operated from a mode of low speed and high torque to a mode of high speed and low torque. At the low speed, in particular, the rotary electric machine is required to operate with a low voltage and a large current. Also, there is a strong demand for low vibrations and low noises when the rotary electric machine is applied to automobiles. In the case of a low-voltage and large-current motor, for example, it is required to reduce the number of windings of a stator and to increase the areas of conductors, thereby reducing the resistance value of a coil. In addition, because of a strong demand for low vibrations and low noises in the vehicular rotary electric machine, how to realize low vibrations and low noises must be solved when the number of slots is small.

In contrast, according to this embodiment, the tandem rotor is used to increase the motor torque, and the pole centers of the two paired claw poles constituting the tandem rotor are shifted from each other such that respective orders of spatial harmonic waves and torque pulsations of the 3-phase motor are increased. As a result, the torque pulsations can be reduced and a low-vibration and low-noise motor can be realized.

The construction of a second field-coil synchronous motor used in the electric four-wheel drive vehicle of the present invention will be described below with reference to FIGS. 24-27.

First, the overall structure of the second field-coil synchronous motor used in the electric four-wheel drive vehicle of the present invention will be described below with reference to FIG. 24.

Figure 24:
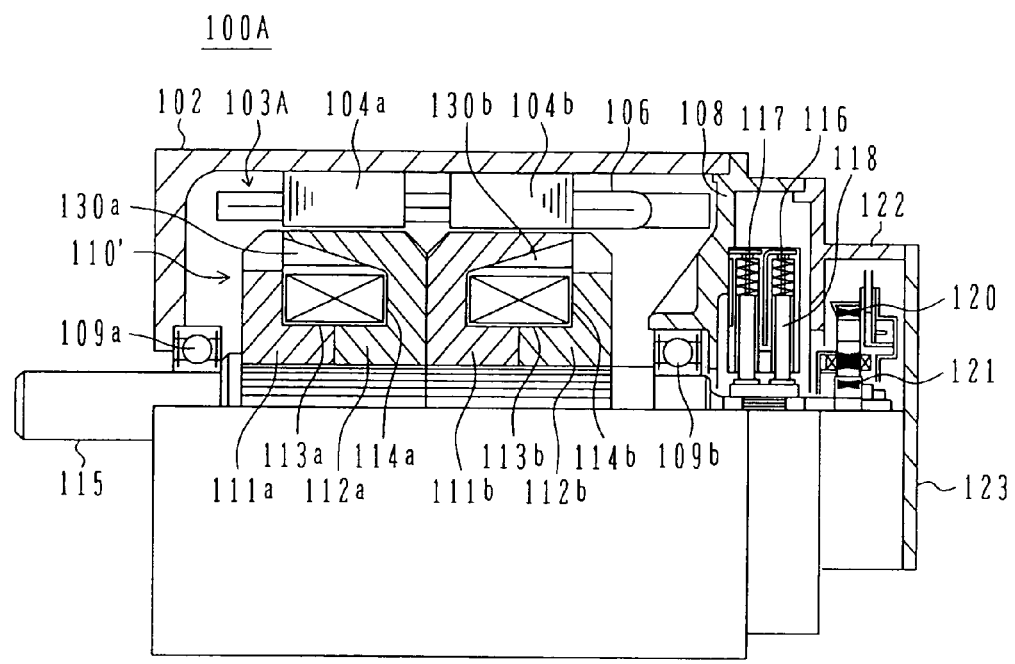
FIG. 24 is a sectional view showing the overall structure of a second field-coil synchronous motor used in the electric four-wheel drive vehicle of the present invention.

FIG. 24 is a sectional view showing the overall structure of the second field-coil synchronous motor used in the electric four-wheel drive vehicle of the present invention. The same reference numerals as those in FIG. 14 denote the same components.

A rotor 110' is a tandem rotor comprising two rotors and is constituted similarly to the rotor 100 shown in FIG. 14. More specifically, the rotor 100' is made up of claw poles 111a, 112a, 111b and 112b, field coils 113a and 113b, and permanent magnets 130a and 130b. The claw poles 111a and 112a, the field coil 113a, and the permanent magnet 130a constitute a first rotor. The claw poles 111b and 112b, the field coil 113b, and the permanent magnet 130b constitute a second rotor. In this embodiment, however, the pole centers of the first and second rotors, i.e., two pairs of claw poles, are matched with each other instead of being shifted.

On the other hand, a stator 103A supported inside a housing 102 is constituted as a tandem stator in which a stator core 104 is divided into two near its center in the axial direction and one 104a of the divided stator cores is shifted from the other 104b in the circumferential direction at an angle of 360°/(number of poles×number of phases×Ns). Here, Ns represents the number of conductors arranged in the same slot in the circumferential direction as mentioned above, and that number of conductors is equal to the number of stator cores divided in the axial direction. Thus, when the stator core is divided into two, Ns is 2, and when the stator core is divided into three, Ns is 3. In the latter case, one stator core 104a is fixed, and while setting the slot center of another stator core 104b as a reference, the center of still another stator core is advanced or retarded in the circumferential direction. When the motor has the tandem structure with 12 poles, 36 slots and 3 phases, for example, the divided stator cores are mechanically shifted 5° (30° in terms of electrical angle) from each other in the circumferential direction. In the case of the tandem structure with 16 poles, 48 slots and 3 phases, the angle at which the divided stator cores are mechanically shifted from each other in the circumferential direction is 3.750.

Additionally, the stator core is divided into the two 104a and 104b in a region where magnetic flux is hard to exit to an outer space from the rotor, i.e., at a position corresponding to axial ends of the claw poles between the two paired claw poles.

The construction of the stator cores and stator coils in the second field-coil synchronous motor used in the electric four-wheel drive vehicle of the present invention will be described below with reference to FIGS. 25-27.

Figure 25:
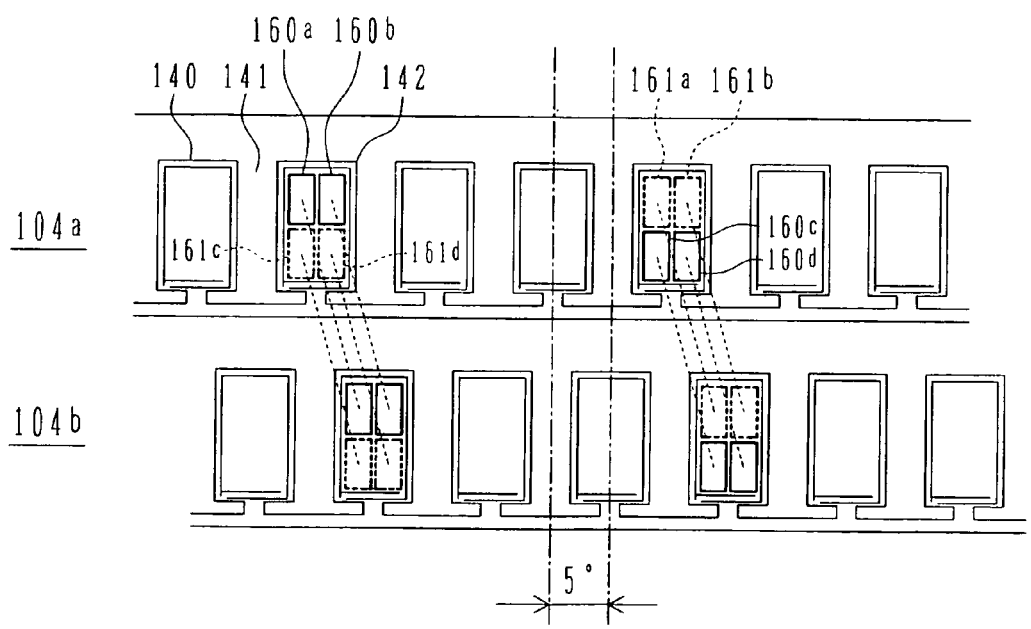
FIG. 25 is a sectional view showing a first layout of stator cores in the second field-coil synchronous motor used in the electric four-wheel drive vehicle of the present invention.

FIG. 25 is a sectional view showing a first layout of the stator cores in the second field-coil synchronous motor used in the electric four-wheel drive vehicle of the present invention. FIG. 26 is a sectional view showing a second layout of the stator cores in the second field-coil synchronous motor used in the electric four-wheel drive vehicle of the present invention. FIG. 27 is a perspective view showing the structure of the stator cores and coils in the second field-coil synchronous motor used in the electric four-wheel drive vehicle of the present invention. The same reference numerals as those in FIG. 14 denote the same components.

Figure 26:
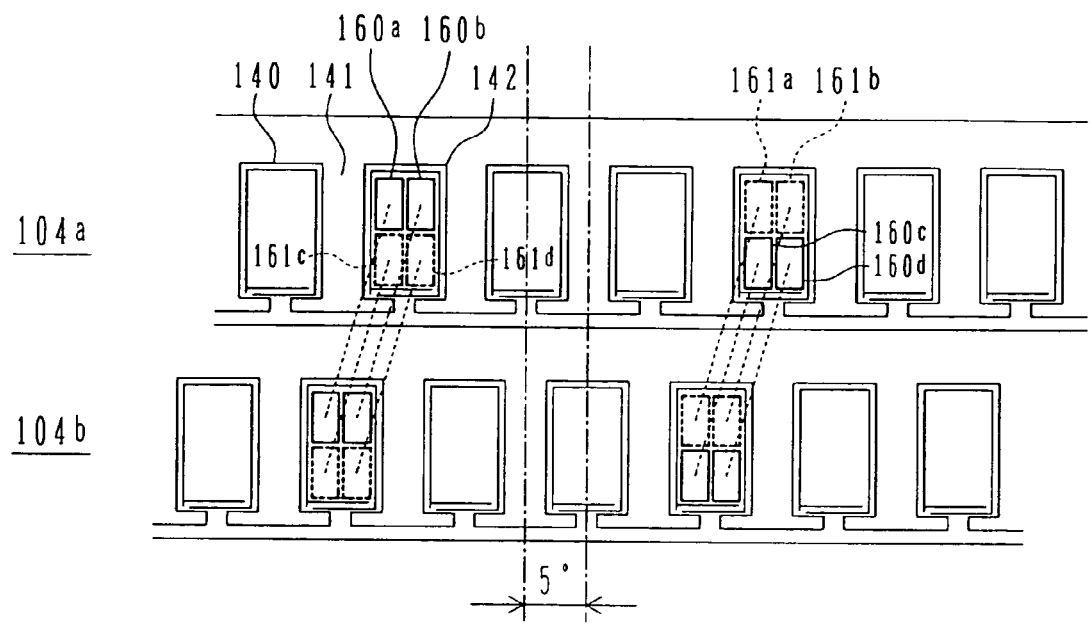
FIG. 26 is a sectional view showing a second layout of the stator cores in the second field-coil synchronous motor used in the electric four-wheel drive vehicle of the present invention.
Figure 27:
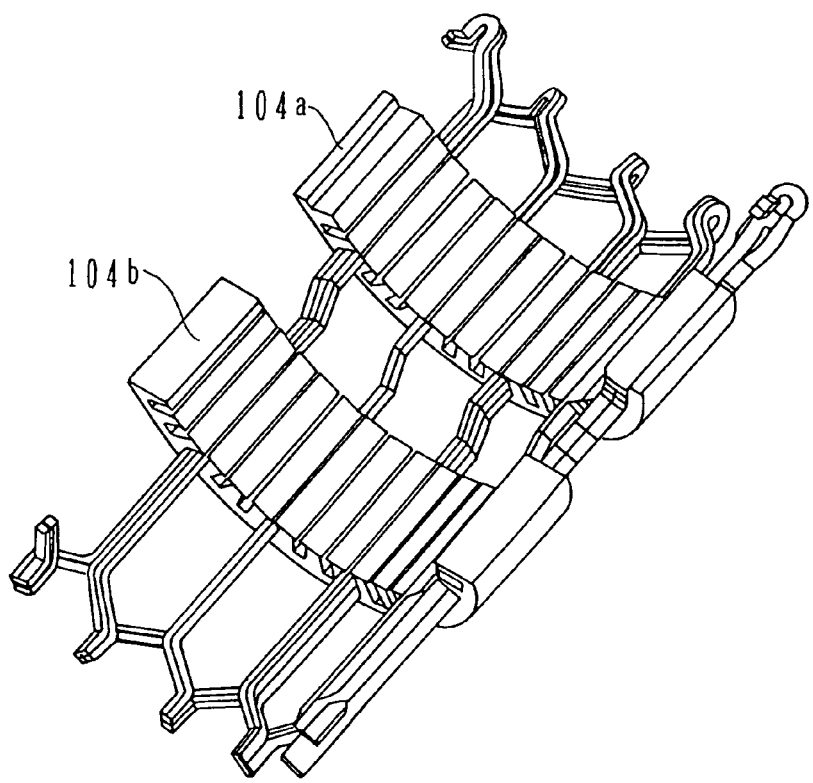
FIG. 27 is a perspective view showing the structure of the stator cores and coils in the second field-coil synchronous motor used in the electric four-wheel drive vehicle of the present invention.

The stator cores 104a and 104b are arranged to be relatively shifted in the circumferential direction as shown in FIG. 25, or in FIG. 26 in a direction opposed to that in the case of FIG. 25. Conductors 160a, 160b, 161a and 161b constituting the stator coils are arranged in each of slots of the stator cores 104a and 104b.

Furthermore, as shown in FIG. 26, the conductors 160a, 160b, 161a and 161b are bent at an angle of 5° in the circumferential direction in a space between the stator cores 104a and 104b.

According to the second field-coil synchronous motor, as described above, by dividing the stator core into two and shifting the divided stator cores from each other in the circumferential direction, a similar effect to that obtained by shifting the pole centers of the paired claw poles of the tandem rotor can be obtained. As a result, it is possible to increase respective orders of spatial harmonic waves and torque pulsations of the 3-phase motor, and to reduce the torque pulsations, thus realizing a low-vibration and low-noise motor.

Further, by employing the structure described above, a rotary electric machine with 36 slots and 12 poles, for example, can provide the same effect obtained by a rotary electric machine with 72 slots and 12 poles. This reduction in number of slots to a half contributes to reducing the area occupied by insulating materials disposed in the slots of the stator core and increasing the occupancy rate of the conductors. In addition, since the stator core is divided into two with a space between the divided two stator cores, the amount of materials used can be reduced, thus realizing a reduction in both weight and cost of the rotary electric machine.

What is claimed is:

1. A control unit for use in an electric four-wheel drive vehicle
wherein said electric four-wheel drive vehicle comprises
an internal combustion engine for driving front wheels,
a field coil AC synchronous motor for driving rear wheels, said motor being a field-coil synchronous motor having a field coil;
a generator driven by a rotating force of said internal combustion engine and outputting DC power; and
an inverter for converting the DC power outputted from said generator to AC power, and supplying the AC power to said AC synchronous motor, said generator and said inverter;
said control unit comprising:
control means for outputting control signals for controlling said AC synchronous motor, said generator and said inverter,
wherein said control means outputs a control signal to said inverter for controlling said inverter such that driving torque of said AC synchronous motor is reduced as a rotation speed of said AC synchronous motor increases, thereby controlling the AC power supplied to an armature coil of said synchronous motor,
outputs a control signal to a control circuit of said field coil for controlling a field current flowing through the field coil of said synchronous motor based on at least one input signal of a signal relating to the rotation speed of said AC synchronous motor; or a torque control signal for said AC synchronous motor, and
outputs a control signal to a control circuit of said generator for controlling said generator such that said generator generates power output required by said AC synchronous motor to generate the driving torque.

2. The control unit for use in an electric four-wheel drive vehicle according to claim 1, wherein said control means outputs the control signal to the control circuit of said field coil such that a field current flowing through the field coil of said synchronous motor is reduced as the rotation speed of aid synchronous motor increases.

3. The control unit for use in an electric four-wheel drive vehicle according to claim 1, wherein said control means feedback-controls an output voltage of said generator such that a voltage (Vdc) on the input side of said inverter is matched with a voltage command value (Vdc*) for generating the power generation output to be consumed by driving said AC synchronous motor.

4. The control unit for use in an electric four-wheel drive vehicle according to claim 1,
wherein said control means selectively executes:
voltage feedback control for feedback-controlling an output voltage of said generator such that a voltage (Vdc) on the input side of said inverter is matched with a voltage command value (Vdc*) for generating the power generation output to be consumed by driving said AC synchronous motor; and
current feedback control for feedback-controlling an output current of said generator such that an current (Idc) on the input side of said inverter is matched with a current command value (Idc*) for generating the power generation output to be consumed by driving said AC synchronous motor.

5. An electric drive apparatus for use in an electric four-wheel drive vehicle which drives front wheels by an internal combustion engine comprising:
a field coil AC synchronous motor having a field coil for driving rear wheels;
a generator driven by a rotating force of said internal combustion engine and outputting DC power;
an inverter for converting the DC power outputted from said generator to AC power, and supplying the AC power to said AC synchronous motor; and
control means for outputting control signals for controlling said AC synchronous motor, said generator and said inverter,
wherein said control means outputs a control signal to said inverter for controlling said inverter such that driving torque of said AC synchronous motor is reduced as a rotation speed of said AC synchronous motor increases, thereby controlling the AC power supplied to an armature coil of said AC synchronous motor,
outputs a control signal to a control circuit of said field coil for controlling a field current flowing through the field coil of said AC synchronous motor based on at least one input signal of a signal relating to the rotation speed of said AC synchronous motor or a torque control signal for said AC synchronous motor, and
outputs a control signal to a control circuit of said generator for controlling said generator such that said generator generates power output required by said AC synchronous motor to generate the driving torque.

* * * * *